US012755322B2

(12) United States Patent
Schell

(10) Patent No.: US 12,755,322 B2
(45) Date of Patent: Oct. 6, 2026

(54) SYSTEM AND METHODS FOR PROCESSING IMAGING DATA TO ANALYZE VEGETATION

(71) Applicant: STATE FARM MUTUAL AUTOMOBILE INSURANCE COMPANY, Bloomington, IL (US)

(72) Inventor: Elizabeth Schell, Alpharetta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/626,098

(22) Filed: Apr. 3, 2024

(65) Prior Publication Data

US 2025/0252501 A1 Aug. 7, 2025

Related U.S. Application Data

(60) Provisional application No. 63/550,285, filed on Feb. 6, 2024, provisional application No. 63/625,398, filed on Jan. 26, 2024.

(51) Int. Cl.
*G06Q 40/00* (2023.01)
*G06Q 40/08* (2012.01)
(Continued)

(52) U.S. Cl.
CPC ............. *G06Q 40/08* (2013.01); *G06Q 50/02* (2013.01); *G06V 20/176* (2022.01); *G06V 20/188* (2022.01)

(58) Field of Classification Search
CPC ..... G06Q 40/08; G06V 20/176; G06V 20/188
See application file for complete search history.

(56) References Cited

U.S. PATENT DOCUMENTS 8,433,344 B1 4/2013 Virga
8,712,805 B1 4/2014 Ferries et al.
(Continued)

FOREIGN PATENT DOCUMENTS

AU 2015100551 A4 5/2015
CA 3145258 A1 * 1/2021 ............ G06Q 40/08
WO 2018052595 A1 3/2018

OTHER PUBLICATIONS

Kousky et al: "Flood Damage and Mortgage Credit Risk: A Case Study of Hurricane Harvey", Journal of Housing Research, vol. 29, 2020 (Year: 2020).*

(Continued)

*Primary Examiner* — Edward J Baird
(74) *Attorney, Agent, or Firm* — Bookoff McAndrews, PLLC

(57) ABSTRACT

Systems and methods for analyzing vegetation are disclosed. The method may include, such as by one or more processors, transceivers, and/or a machine learning model: (1) receiving real-time data associated with a property of a user from one or more data sources, wherein the data includes one or more of image or LiDAR data for the property; (2) inputting the real-time data into the machine learning model to generate a prediction of one or more hazards to the property, wherein the machine learning model is a trained machine learning model that processes historical data to learn associations indicative of the one or more hazards to the property; (3) generating one or more recommended actions for reducing at least one of the one or more hazards; and/or (4) determining a completion of the one or more recommended actions based upon real-time response data associated with the one or more recommended actions.

18 Claims, 5 Drawing Sheets

(51) Int. Cl.

*G06Q 50/02* (2012.01)
*G06V 20/10* (2022.01)

(56) References Cited

U.S. PATENT DOCUMENTS

| | | | | |
|---|---|---|---|---|
| 9,489,397 | B1 * | 11/2016 | Olson | G06Q 40/08 |
| 10,055,793 | B1 | 8/2018 | Call et al. | |
| 10,062,118 | B1 | 8/2018 | Bernstein et al. | |
| 10,229,394 | B1 | 3/2019 | Davis et al. | |
| 10,623,509 | B2 | 4/2020 | Delinselle et al. | |
| 10,672,081 | B1 | 6/2020 | Lyons et al. | |
| 10,699,346 | B1 | 6/2020 | Corder et al. | |
| 10,861,115 | B1 | 12/2020 | Stricker et al. | |
| 10,991,049 | B1 | 4/2021 | Devereaux et al. | |
| 11,003,334 | B1 | 5/2021 | Conway et al. | |
| 11,037,255 | B1 | 6/2021 | Ganev et al. | |
| 11,055,797 | B1 | 7/2021 | Carone | |
| 11,087,347 | B1 | 8/2021 | De Guia et al. | |
| 11,087,420 | B1 | 8/2021 | Trundle | |
| 11,210,741 | B1 | 12/2021 | Allen et al. | |
| 11,410,416 | B1 | 8/2022 | Khmelev et al. | |
| 11,501,100 | B1 | 11/2022 | Geng et al. | |
| 11,656,097 | B2 | 5/2023 | Vega et al. | |
| 11,748,817 | B2 | 9/2023 | Szott | |
| 11,836,216 | B1 | 12/2023 | McIntyre et al. | |
| 2008/0255862 | A1 | 10/2008 | Bailey et al. | |
| 2011/0270773 | A1 | 11/2011 | Siekman et al. | |
| 2011/0295624 | A1 | 12/2011 | Chapin et al. | |
| 2012/0072239 | A1 | 3/2012 | Gibbard et al. | |
| 2012/0134527 | A1 | 5/2012 | Culp et al. | |
| 2012/0254710 | A1 * | 10/2012 | Flanagan | G06Q 10/0631 715/202 |
| 2014/0257862 | A1 | 9/2014 | Billman et al. | |
| 2015/0061859 | A1 | 3/2015 | Matsuoka et al. | |
| 2016/0048934 | A1 | 2/2016 | Gross | |
| 2016/0055594 | A1 | 2/2016 | Emison | |
| 2016/0275633 | A1 | 9/2016 | Gitt et al. | |
| 2016/0321587 | A1 | 11/2016 | Gitt et al. | |
| 2018/0033087 | A1 | 2/2018 | Delinselle et al. | |
| 2019/0188797 | A1 * | 6/2019 | Przechocki | H04L 67/12 |
| 2019/0251520 | A1 | 8/2019 | Bentley, III et al. | |
| 2021/0011448 | A1 | 1/2021 | Coleman et al. | |
| 2021/0018335 | A1 | 1/2021 | Hood | |
| 2021/0019847 | A1 | 1/2021 | Sneed | |
| 2021/0034866 | A1 | 2/2021 | Appel et al. | |
| 2021/0150651 | A1 | 5/2021 | Shoup | |
| 2021/0182986 | A1 | 6/2021 | Butler et al. | |
| 2021/0232818 | A1 * | 7/2021 | Saxena | G06V 20/176 |
| 2021/0279791 | A1 | 9/2021 | Jacoby | |
| 2021/0350471 | A1 | 11/2021 | Hakimi-Boushehri et al. | |
| 2021/0390624 | A1 * | 12/2021 | Hayward | G06N 3/0464 |
| 2022/0004684 | A1 * | 1/2022 | Davis | G06F 30/20 |
| 2022/0156845 | A1 | 5/2022 | Bryant et al. | |
| 2022/0215744 | A1 | 7/2022 | Ton-That et al. | |
| 2022/0237764 | A1 * | 7/2022 | Mullet | G06Q 50/16 |
| 2022/0343443 | A1 | 10/2022 | Graham et al. | |
| 2022/0391794 | A1 | 12/2022 | Singh et al. | |
| 2022/0405856 | A1 * | 12/2022 | Hedges | G06Q 40/08 |
| 2023/0035517 | A1 | 2/2023 | Bentley, III et al. | |
| 2023/0259798 | A1 * | 8/2023 | Modugula | G06Q 10/0635 706/10 |
| 2023/0267694 | A1 * | 8/2023 | Breitweiser | G06Q 50/186 345/633 |
| 2023/0342859 | A1 * | 10/2023 | Gibson | G06Q 50/163 |
| 2024/0311732 | A1 * | 9/2024 | Boutin | G06Q 10/0635 |
| 2025/0061171 | A1 | 2/2025 | McIntyre et al. | |
| 2025/0184283 | A1 * | 6/2025 | Power | H04L 41/16 |
| 2025/0252500 | A1 | 8/2025 | Schell | |

OTHER PUBLICATIONS

"NV5 Geospatial Distribution Solutions." https://www.nv5.com/distribution-solutions/?campaignid=441076676&adgroupid=1284230008064470&utm_source=bing&utm_medium=cpc&utm_campaign=Rapid%20Reporting%20Search&utm_term=vegetation%20management&utm_content=Vegetation%20Management.

"Yard Safety." https://www.pge.com/en/outages-and-safety/safety/yard-safety.html.

"5 Dangers of trees and how they can damage your home—Canopy Tree and Land Company." https://www.canopytreeandland.com/article/5-dangers-of-trees-damage-your-home.

"Find an Arborist." https://www.treesaregood.org/findanarborist.

"Fire-Smart landscaping for enhanced wildfire safety | Cal Fire," Ready for Wildfire, Mar. 18, 2024. https://readyforwildfire.org/prepare-for-wildfire/fire-smart-landscaping/.

"Garden Answers—Plant identification," Garden Answers, Feb. 13, 2020. https://www.gardenanswers.com/.

"GeoDigital | Vegetation Management," GeoDigital. https://geodigital.com/vegetation-management/.

"How to create defensible space for wildfire safety | Cal Fire," Ready for Wildfire, Mar. 25, 2024. https://readyforwildfire.org/prepare-for-wildfire/defensible-space/#:~:text=Defensible%20space%20is%20the%20buffer,flame%20contact%20or%20radiant%20heat.

"Identify, explore and share your observations of wild plants." https://identify.plantnet.org/.

"INaturalist," iNaturalist. https://www.inaturalist.org/.

"International Society of Arboriculture > Credentials > Types of credentials." https://www.isa-arbor.com/Credentials/Which-Credential-is-Right-for-You.

"LeafSnap—Plant identification." https://plantidentifier.info/.

"PictureThis—Plant Identifier App | Plant Identification Online," PictureThis. https://www.picturethisai.com/.

"PlantSnap—Plant Identifier App, #1 mobile app for plant identification," Plantsnap—Identify Plants, Trees, Mushrooms With an App, Sep. 22, 2023. https://www.plantsnap.com/.

"Vegetation Management—Environmental Intelligence Suite | IBM." https://www.ibm.com/products/environmental-intelligence-suite/vegetation-management.

"Vegetation management solution," Accenture. https://www.accenture.com/us-en/services/utilities/vegetation-management.

"When Trees Attack: The deadly costs of hidden tree root problems," Tree Triage, Nov. 2, 2021. https://treetriage.com/tree-removal/tree-root-problems/.

"Wildfire safety: What to do before a wildfire," State Farm. https://www.statefarm.com/simple-insights/residence/wildfire-safety-tips.

A. Stimpson, "Wildfire smoke can be devastating to your health. Here's what you need to know," Popular Mechanics, Feb. 21, 2024. [Online]. Available: https://www.popularmechanics.com/science/health/a44120833/wildfire-smoke-brings-dangerous-particulate-matter/.

Agrioadmin, "An app that identifies plant diseases and diagnoses plant problems," Agrio, Apr. 1, 2024. https://agrio.app/An-app-that-identifies-plant-diseases-and-pests/.

App Store, "iplant—Plant identifier," App Store, Apr. 22, 2018. https://apps.apple.com/gb/app/iplant-plant-identifier/id1372113110.

C. Delbert, "How the 'Miracle House' in Lahaina Survived the Devastating Maui Wildfires," https://www.msn.com/en-us/weather/other/how-the-miracle-house-in-lahaina-survived-the-devastating-maui-wildfires/ar-AA1fKGek.

H. Miles, "27 tree species that are bad for foundations (Explained)," Home Inspection Insider, Jun. 28, 2023. https://homeinspectioninsider.com/tree-species-that-are-bad-for-foundations/.

J. Kissinger, "Give your yard back to nature," Popular Mechanics, Apr. 2, 2024. [Online]. Available: https://www.popularmechanics.com/home/lawn-garden/a28197493/give-your-yard-back-to-nature/.

Lisa Kaplan Gordon, "The ugly truth about those beautiful trees near your home," Real Estate News & Insights | realtor.com, Apr. 26, 2018. [Online]. Available: https://www.realtor.com/advice/home-improvement/dark-side-of-trees-near-home/.

Purdue Extension—Forestry and Natural Resources, "Question: Can tree roots cause damage to a home's foundation? Purdue Extension Forestry & Natural Resources," Got Nature?, Oct. 27, 2020. https://www.purdue.edu/fnr/extension/question-can-tree-roots-cause-damage-to-a-homes-foundation/.

(56) References Cited

OTHER PUBLICATIONS

State of California, "Xeriscaping—CalRecycle Home Page," CalRecycle Home Page. https://calrecycle.ca.gov/organics/xeriscaping/.
Z. DeAngelis, "9 Trees That Can Damage Your Foundation (& How To Fix)—Tree Journey," Tree Journey, Nov. 21, 2021. https://treejourney.com/trees-that-can-damage-your-foundation/.
Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.
Michalis et al., "Quality Evaluation of Residential Houses: The Development of a Real-Time Quality Assessment Tool," p. 11-12, Jan. 2013.Retrieved from: https://www.researchgate.net/publication/233841366_Quality_Evaluation_of_Residential_Houses_The_Development_of_a_Real-Time_Quality_Assessment_Tool.
Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.
Spoor et al., "How can data generated by smart home devices help identify consumer needs?," p. 7, Jul. 2016.Retrieved from: https://essay.utwente.nl/69990/1/Spoor_BA_BMS.pdf.

* cited by examiner

SYSTEM AND METHODS FOR PROCESSING IMAGING DATA TO ANALYZE VEGETATION

CROSS-REFERENCE TO RELATED APPLICATION

This patent application claims the benefit of priority to U.S. Provisional Applications 63/625,398 filed on Jan. 26, 2024, and 63/550,285 filed on Feb. 6, 2024, the entireties of which are incorporated herein by reference.

TECHNICAL FIELD

This present disclosure relates generally to the field of data processing and predictive analytics. In particular, the present disclosure relates to analyzing real-time data such as imaging, sensor, and/or LiDAR data relating to vegetation for predicting risks for properties and generating recommendations to prevent the predicted risks.

BACKGROUND

Trees and overgrown vegetation may pose risks to insured properties (e.g., houses, vehicles, etc.). In one instance, a property may be damaged by falling trees as a result of strong winds (e.g., hurricanes, downbursts, derechos, etc.), heavy rain, heavy snow, saturated soils (e.g., due to flooding), or lightning. Apart from direct damages to the property, falling trees may also damage power lines and thus cause power outages or other power issues that may in turn damage assets inside the house (e.g., appliances or other electronics because of power surges). In another instance, overgrown vegetation around the property may pose a wildfire risk and/or attract pests that could damage the property. Additionally, insufficient vegetation may make the property vulnerable to flooding, erosion, and/or landslides.

Conventional solutions for understanding and/or addressing such circumstances may be technically challenged and/or not optimal for identifying potential risks and/or preventative measures. Conventional systems may also be technically challenged or unequipped to analyze changing information, such as preventative measures undertaken by the users. Conventional techniques may include additional ineffectiveness, encumbrances, inefficiencies, and other drawbacks, as well.

SUMMARY

The present embodiments may relate, inter alia, solving one or more technical challenge, such as those discussed above and elsewhere herein. Specifically, the present computers systems and computer-implemented methods may solve technical challenges by leveraging data such as imaging data, sensor data, real-time data, and/or historical data to (i) predict risk(s) or hazards associated with a property and/or (ii) generate recommendation(s) (such as corrective actions), and/or home, vehicle, or other damage mitigative or preventive actions, to prevent the occurrence of the predicted risk(s) and/or hazards, and/or to mitigate resulting damage from risks and/or hazards, e.g., via machine learning.

In one aspect, a computer-implemented method for analyzing vegetation and/or determining damage mitigating or preventing actions may be provided. The computer-implemented method may be implemented via one or more local or remote processors, servers, transceivers, sensors (including cameras or video recorders, and audio recorders), memory units, mobile devices, wearables, smart watches, smart contact lenses, smart glasses, smart vehicles, smart homes, augmented reality glasses, virtual reality headsets, mixed or extended reality glasses or headsets, voice bots or chatbots, ChatGPT bots, InstructGPT bots, Codex bots, Google Bard bots, and/or other electronic or electrical components, which may be in wired or wireless communication with one another. In one instance, the computer-implemented method may be performed by one or more local or remote processors of a computing system in communication with one or more local or remote data sources. The computer-implemented method may include, via one or more processors, transceivers, sensors, and/or other components: (1) receiving imaging, LiDAR, audio, and/or other sensor data associated with a property of a user from one or more data sources; (2) generating a prediction of one or more risks and/or hazards to the property based upon the imaging, LiDAR, audio, and/or other sensor data and one or more of policy data associated with the user or historical data; (3) generating (and/or transmitting to and/or presenting on an output device, such as user mobile device) one or more recommended actions (such as actions that mitigate or prevent home or vehicle damage) configured to reduce at least one of the one or more risks and/or hazards; (4) determining or identifying a completion of the one or more recommended actions (such as by monitoring home sensor, image, LiDAR, audio, and/or other data associated with a home, and comparing the sensor, image, LiDAR, audio, and/or other data to a baseline or inputting the sensor, image, LiDAR, audio, and/or other data into a machine learning module); and/or (5) determining and/or providing at least one benefit, such as a discount or other reward, to the user based upon the completion of the one or more recommended actions. The method may include additional, less, or alternate functionality, including that discussed elsewhere herein.

In another aspect, a computer-implemented method for analyzing vegetation and/or determining damage mitigating or preventing actions may be provided. The computer-implemented method may be implemented via one or more local or remote processors, servers, transceivers, sensors (including cameras and/or video recorders, and/or audio recorders), memory units, mobile devices, wearables, smart watches, smart contact lenses, smart glasses, smart vehicles, smart homes, augmented reality glasses, virtual reality headsets, mixed or extended reality glasses or headsets, voice bots or chatbots, ChatGPT bots, InstructGPT bots, Codex bots, Google Bard bots, and/or other electronic or electrical components, which may be in wired or wireless communication with one another. In one instance, the computer-implemented method may be performed by one or more local or remote processors of a computing system in communication with one or more local or remote data sources and a machine learning model. The computer-implemented method may include, via one or more processors, transceivers, sensors, cameras, and/or other components, (1) receiving real-time sensor and/or other data associated with a property of a user from one or more data sources, wherein the data includes one or more of image, LiDAR, audio, sensor, mobile device, smart vehicle, and/or other data for the property; (2) inputting the real-time sensor and/or other data into a machine learning model to generate a prediction of one or more risks or hazards to the property (and/or associated vehicles), wherein the machine learning model is a trained machine learning model that processes historical data to learn associations indicative of the one or more risks or hazards to the property; (3) generating one or more recommended actions for reducing at least one of the one or more risks or hazards; (4) transmitting the recommended actions to a mobile device of the user for display on the mobile device; and/or (5) determining a completion of the one or more recommended actions based upon real-time response data (such as by gathering, receiving, collecting, analyzing, and monitoring follow-up or subsequent real-time image, LiDAR, audio, mobile device, smart vehicle, and/or other sensor data) associated with the one or more recommended actions. The method may include additional, less, or alternate functionality, including that discussed elsewhere herein.

In yet another aspect, a computer-implemented method for (i) generating, collecting, and/or analyzing sensor, image, LiDAR, audio, and/or other data and/or (ii) generating, and/or monitoring the progress of, landscape recommendations may be provided. The computer-implemented method may be implemented via one or more local or remote processors, servers, transceivers, sensors, memory units, mobile devices, cameras, video recorders, audio recorders, wearables, smart watches, smart contact lenses, smart vehicles, smart homes, smart glasses, augmented reality glasses, virtual reality headsets, mixed or extended reality glasses or headsets, voice bots or chatbots, ChatGPT bots, InstructGPT bots, Codex bots, Google Bard bots, and/or other electronic or electrical components, which may be in wired or wireless communication with one another. In one instance, the computer-implemented method may be performed by one or more local or remote processors of a computing system in communication with one or more local or remote data sources. The computer-implemented method may include by one or more processors, transceivers, sensors, cameras, video or audio recorders, smart vehicles, mobile devices, and/or other components: (1) receiving imaging, LiDAR, sensor, audio, video, mobile device, smart vehicle, and/or other data associated with a property of a user from one or more data sources; and/or (2) generating a landscape layout for the property to reduce at least one or more risks or hazards to the property based upon the landscape. The landscape layout may include one or more of building defensible spaces; sowing lower-maintenance plant varieties; sowing plant varieties with strong roots; trimming or removal of one or more trees; removal of flammable vegetation around the property; removal of overgrown vegetation that attracts pests. The landscape layout may include one or more hazards or potential hazards, and/or one or more recommendations to reduce, prevent, or mitigate hazards or potential hazards. The method may include additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals

Figure 1:
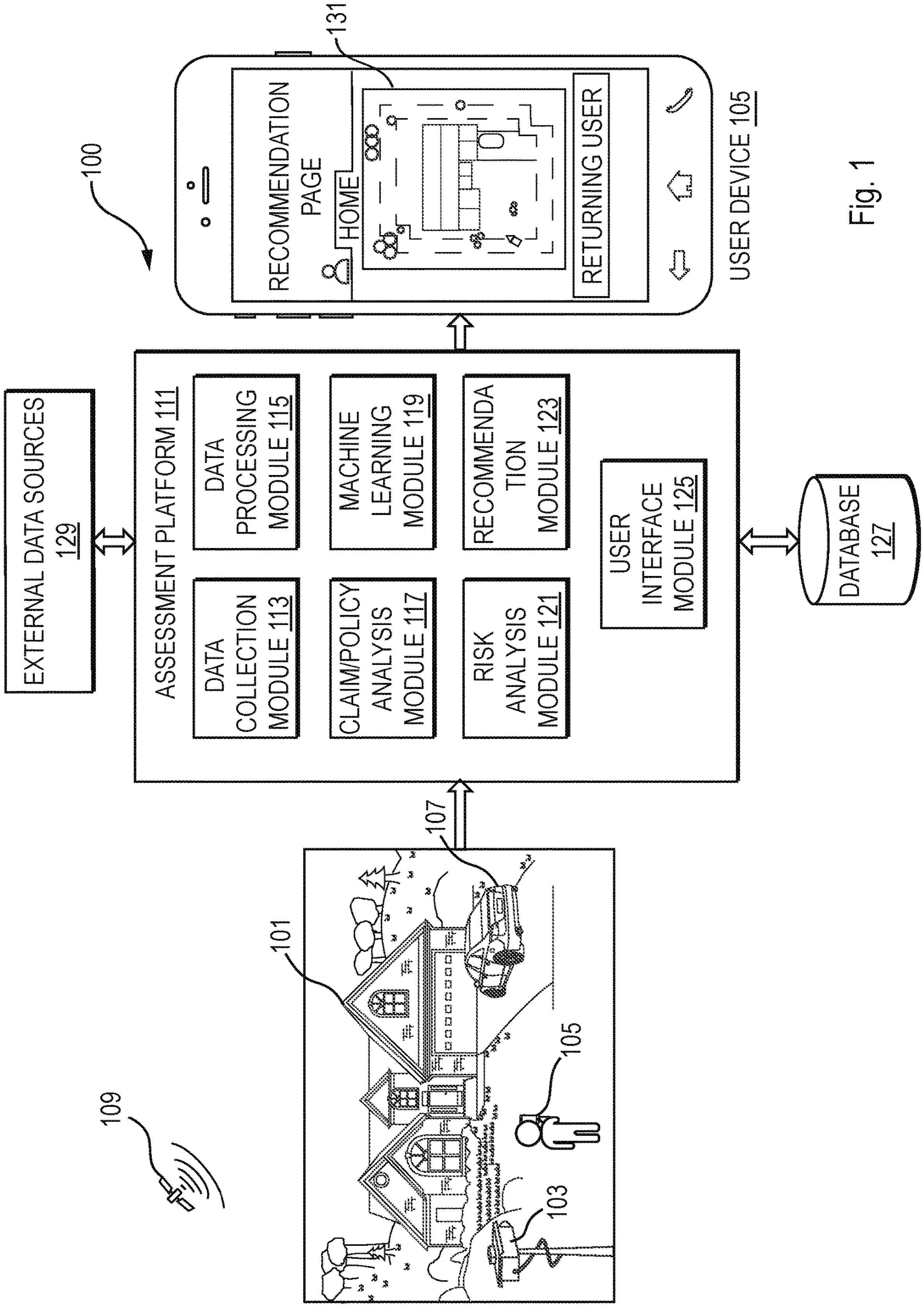
FIG. 1 is a diagram showing an exemplary computer system and/or computing environment for predicting risk(s) or hazards for a property and generating recommendation(s) to prevent the occurrence of the predicted risk(s) or hazards, according to certain aspects of the disclosure.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

The present embodiments may relate, inter alia, computers systems and computer-implemented methods that solve technical challenges by leveraging data such as imaging data, sensor data, real-time, and/or historical data to predict risk(s) or hazards associated with a property and (i) generate recommendation(s), (ii) home, vehicle, or other damage mitigative or preventive actions, and/or (iii) monitor the progress of instituting the recommendations generated, to prevent or reduce the occurrence of the predicted risk(s) or hazards, e.g., via machine learning.

In various embodiments, computer systems and computer-implemented methods for analyzing vegetation may be provided. The methods may include, such as by one or more processors, transceivers, and/or sensors: (1) receiving imaging data associated with a property of a user from one or more data sources; (2) generating a prediction of one or more hazards to the property based upon the imaging data and one or more of policy data associated with the user or historical data; (3) generating, determining, and presenting recommended or corrective actions configured to reduce the hazard(s); and/or (4) monitoring the implementation and/or completion of the recommended or corrective actions. The method may also include (5) determining at least one benefit to the user based upon the completion of the recommended or corrective actions.

In one aspect, a computer-implemented method for analyzing vegetation, identifying potential hazards, and/or determining damage mitigating or preventing actions may be provided. In another aspect, a computer-implemented method for (i) generating, collecting, and/or analyzing sensor, image, LiDAR, mobile device, smart vehicle, smart home, and/or other data, and/or (ii) generating, and/or monitoring the progress of, landscape recommendations and/or hazard removal or reduction may be provided.

By way of background, overgrown vegetation and trees may pose a risk to a property or homeowner. Conventional systems have been used to, for example, detect vegetation and trees in the surroundings of a property, but may be technically challenged in determining the condition, type, and/or attributes of the vegetation and the trees that may pose a threat to the property.

In one instance, trees may fall and damage the property due to stem failure, root failure, branch failure, or nature or attributes of the tree (e.g., trees that naturally have shallow root structures, etc.). Conventional systems may not provide functionality for detecting or sufficiently identifying such attributes of the trees that are hidden from plain view during the basic monitoring of the surroundings of the property. Trees may also fall due to extreme weather conditions (e.g., strong winds, heavy rain, heavy snow, lightning, etc.).

Additionally, overgrown vegetation may pose fire risks due to extreme heat. And conventional systems may not account for real-time weather data while observing the environment around the property. Tree damage may also be the consequence of possibly numerous perils (e.g., wind, wildfire, flooding, earthquake, liability (neighbor's tree falls on the property), etc.). Since there are numerous perils, it may be difficult to appropriately allocate and or account for risk or damage associated with vegetation. Additionally, some properties may be located in a flood-prone area.

Conventional systems may not utilize real-time sensor and image data, location data, historical claims data, and other data to provide recommendations regarding vegetation and tree varieties for reducing the risk of home, vehicle, and other damage from a flood or a wildfire. Hence, there is a need for advanced data-driven models, methods, and tools for processing real-time sensor, LiDAR, mobile device, smart home, smart vehicle, image data, audio data, and/or historical data (e.g., via a trained machine learning model) to understand the potential risks for the property, as well as determine preventative measures and reassess risk and/or hazards after such measures are completed or are in progress.

Exemplary Computer System

To address technical challenges such as the above, system 100 of FIG. 1 improves the state of conventional technologies by implementing advanced data processing and computing capabilities into computer-implemented methods and computer systems for processing real-time and historical data to predict risk(s) associated with a property and generate recommendation(s) to prevent the occurrence of the predicted risk(s). In one instance, the system 100 may utilize a machine learning model trained on historical data to learn associations between data such as patterns and trends that are indicative of an impending risk, and make accurate predictions on the likelihood of the risk based upon the current data (e.g., real-time data) that is inputted to the machine learning models.

In one instance, the predicted risk(s) and/or hazards associated with the property may include: (i) identifying hazard trees that present a fall risk; (ii) predicting areas where tree trimming or removal is necessary to protect the property; (iii) identifying assets that are vulnerable to wildfire based upon the amount of vegetation in the immediate surroundings; (iv) identifying areas that are vulnerable to flooding due to lack of vegetation; (v) identifying areas that are vulnerable due to excessive erosion; and/or (vi) identifying trees and vegetation that attract pests that cause damage to the property. It is understood that any other predictions relating to the risk(s) and/or hazards associated with the property may be performed by the system 100.

In one instance, the generated recommendation(s) to prevent the occurrence of the predicted risk(s) and/or hazards, and/or to reduce the damage caused by predicted risks or hazards, may include: (i) advising users (e.g., customer, policyholders, etc.) on preventative maintenance and trimming cycles; (ii) building proactive asset management strategies related to vegetative risk and adjust premiums according to the risk; (iii) providing recommendations on suitable vegetation to plant for loss prevention; (iv) educating the users on smart vegetation management practices that support sustainability goals; and/or (v) predicting response actions and providing real-time response upon vegetation causing damages to the property.

It is understood that any other type of recommendation(s) to prevent the occurrence of the predicted risk(s) and/or hazards may be generated by the system 100. For example, given the global climate crisis, there is a social responsibility to protect trees and vegetation. Thus, the system 100 while generating recommendations to remove trees or vegetation to protect the property, may also recommend suitable replacements for the removed trees or vegetation.

In one instance, the assessment platform 111 may generate one or more recommended action(s) based upon the type of risk(s) and/or hazard(s). For instance, one or more action(s) may have a predetermined association with one or more risks or hazards.

In one example, the assessment platform 111 may determine that property 101 is in a geographical area with a high risk of erosion. The assessment platform 111 may recommend planting vegetation with strong roots at a specific region of the property 101 (e.g., zone 2) to reduce the chances of erosion.

In another example, the assessment platform 111 may determine property 101 is in a geographical area with a high risk of wildfire. The assessment platform 111 may recommend building a defensible space around property 101 by planting vegetation that does not burn well at a particular area of the property 101 (e.g., zone 1) to stop the spread of wildfire.

The assessment platform 111 may also recommend relocating flammable objects (e.g., firewood, lumber, furniture, etc.) further away from the property 101 (e.g., relocate to zone 2). The predetermined associations may include, for example, a predetermined set of rules or criteria that, when applied to an input risk, output one or more actions.

In one instance, historical data may be leveraged to determine associations between risks, hazards, and actions. For example, historical data of damage and/or lack thereof to various properties at which various actions may have been taken may be evaluated. In another example, risks or hazards determined for various properties may be evaluated against later damages, in which different actions were taken for the various properties prior to the damages. Via such techniques and/or any other suitable technique, an impact of various actions on mitigating various risks or hazards may be determined.

In one instance, determination of an action includes additional analysis. To build on a previous example, for a property 101 in a geographical area with a high risk of erosion, the assessment platform 111 may recommend planting vegetation with strong roots at a specific region of the property 101 (e.g., zone 2) to reduce the chances of erosion. The specific region for the planting may be determined, for instance, by analyzing information regarding the property, e.g., locations or amount of vegetation, and re-evaluating the resulting risk or hazard.

In another instance, the specific region may be determined by using a machine learning model or algorithm trained to determine locations of vegetation to improve erosion resistance. In yet another instance, the assessment platform may apply one or more predetermined rules to specific characteristics of the property and/or other data in order to identify the specific location. It should be understood that a similar procedure may be performed for other actions, e.g., to identify portions of a tree for pruning, placement of a structure, etc.

The system 100 may be useable to promote proactive asset management strategies related to vegetative risk or hazard by implementing data science and geospatial analytics. In one instance, the system 100 may offer incentives in the form of premium discounts or other benefits to policyholders who implement the recommendations (e.g., responsible vegetation management practices). The system 100 may personalize coverage options and tailor the premiums taking into consideration the policyholder's risk or hazard related to vegetation. The above technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 is a diagram showing an exemplary computer system for predicting risk(s) and hazards for a property and generating recommendation(s) to prevent the occurrence of the predicted risk(s) or hazard(s), according to certain aspects of the disclosure. FIG. 1 includes the computer system 100 that comprises a property 101, a camera 103, a user device 105 (or mobile device, wearable, smart glasses, VR headset, AR glasses, etc.), a smart vehicle 107, a satellite 109, an assessment platform 111, a database 127, and an external data sources 129. It should be understood that other implementations of system 100 may omit one or more of the foregoing components and/or may include additional components, as the case may be.

In one instance, the property 101 may represent the property of the user (e.g., a customer, or an existing policyholder or a potential policyholder seeking insurance coverage from an insurance provider). The property 101 may include one or more man-made structures, such as a road, a patio or deck, a retention wall, a bridge, a house, a garage, a commercial building, a barn, a vehicle, a boat, etc. The property may also include any number of natural features (e.g., trees, vegetation, ground area, bushes, ponds, mountains, hills, ravines, hills, slopes, brush, etc.). It is understood that the property 101 may include any type of assets for which the user seeks insurance coverage from the insurance provider.

In one instance, the camera 103 (e.g., a still camera configured to capture still photographs, a video camera configured to capture a series of images over time as frames of video) may capture imaging data such as real-time images and/or videos of the property 101. In one instance, the user device 105 (e.g., a smart mobile communication device, a wireless communication device, a multimedia tablet, a notebook computer, a digital camera/camcorder, VR headset, AR glasses, wearable, smart glasses, mobile device, etc.) may capture real-time images or videos of the property 101, e.g., instead of or in addition to the camera 103. In one instance, the smart vehicle 107 (e.g., electric vehicles, drones, etc.) may capture real-time images or videos of the property 101, e.g., instead of or in addition to the foregoing. Smart home cameras and sensor may also capture real-images images, videos, audios, and other data of the property 101.

Additionally or alternatively, in one instance, the satellite 109 or other aerial sensors (such as drone sensors and cameras), may capture real-time images of terrestrial structures, objects, and other features of the property 101 from an aerial perspective, e.g., instead of or in addition to the foregoing. The satellite 109 may include a light detection and ranging (LiDAR) device, an interferometric synthetic aperture radar (IFSAR) device, or any other type of remote sensing device(s) for sensing/capturing physical characteristics of terrestrial structures, objects, and other features of the property 101 from an aerial perspective. In one instance, LiDAR data may be collected via a fixed-wing plane. This entails the use of LiDAR sensors mounted on an aircraft to emit laser pulses towards the target area of the Earth's surface. LiDAR data may be collected through various methods, and the choice of LIDAR data collection method may depend on factors such as the size of the area to be surveyed, the required resolution, and accessibility. In one instance, the sensors include hyperspectral sensors for capturing data at numerous contiguous spectral bands, allowing for a more detailed and comprehensive analysis of the spectral characteristics of a scene or an object. Hyperspectral imaging may be applied to assess risks related to natural disasters (e.g., wildfires, floods, earthquakes, etc.) by providing detailed information about the condition of the property and surrounding environment. In one example, hyperspectral imaging may be used to monitor vegetation health and identify areas susceptible to ignition for assisting in fire management and early detection. In one example, hyperspectral data may be utilized for assessing geological hazards (e.g., landslides, rockslides, or earthquakes), identifying areas at risk, and contributing to hazard mapping and early warning systems. In one example, hyperspectral data may be utilized by the insurance provider(s) to assess property damages more accurately, wherein such detailed information about the affected areas may help in estimating losses and processing claims efficiently. It is understood that any other type of sensor and that any combination or arrangement of sensors and/or cameras may be used, and indeed any other known features of sensors may be used for capturing real-time images and/or videos of the property 101.

The various elements of the computer system 100 may communicate with each other through a communication network. In one instance, the camera 103, the user device 105, the smart vehicle 107, the satellite 109, and/or a smart home controller or system may include a network detection sensor for detecting wireless signals or receivers for different communications (e.g., Bluetooth, Wi-Fi, Li-Fi, near field communication (NFC), etc.) from the communication network. The communication network may support a variety of different communication protocols and communication techniques.

In one instance, the communication network may allow the camera 103, the user device 105 (or one or more user devices), the smart vehicle 107, the satellite 109, and/or a smart home controller or smart home system to communicate with the assessment platform 111. The communication network may include one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one instance, the assessment platform 111 may be a platform with multiple interconnected components. The assessment platform 111 may include one or more servers, intelligent networking devices, computing devices, components, and corresponding software for processing real-time and historical data to predict risk(s) and/or hazards associated with a property and generating recommendation(s) to prevent the occurrence of the predicted risk(s) and/or hazards. In certain embodiments, assessment platform may also include various sensors, cameras, video recorders, audio records, LiDAR devices, smart home controllers, smart home systems or computing devices and sensors, and/or other devices discussed herein.

In one instance, the assessment platform 111 may be aware of the vulnerabilities that exist for the insured property (e.g., property 101) based upon data insights, and may provide real-time response during the claim management process when damages are caused by vegetation. In one instance, the assessment platform 111 may provide a targeted control of existing vegetation around the property 101. For example, the assessment platform 111 may recommend targeted removal of the existing vegetation followed by a replacement for what was removed to meet sustainability objectives.

In one instance, the assessment platform 111 may leverage vegetation-related data to enhance predictive modeling for catastrophe response actions, allowing authorities to anticipate and plan for potential challenges. In one example, the assessment platform 111 may analyze vegetation health, density, and proximity to critical infrastructure (e.g., property 101), estimate the likelihood of specific natural disasters (e.g., wildfires), and recommend preemptive measures such as strategic vegetation management. The assessment platform 111 may provide proactive planning of vegetation around the property 101 for (i) reducing the risk(s) and/or hazard(s), (ii) improving forestry productivity and climate benefit, (iii) reducing the impact of greenhouse gases, (iv) providing clean water, (v) providing flood mitigation, (vi) providing wildfire mitigation, (vii) providing property structural safety, (viii) providing property liability safety (slips, trips, falls, and other unseen hazards), and/or (ix) providing property security and crime prevention (vegetation can provide cover for criminal activity).

In one instance, the assessment platform 111 may utilize the information about the vegetation in a particular area before an event (e.g., a natural disaster) to assess potential damage post-event. In one example, the assessment platform 111 may establish a baseline of vegetation data by mapping and cataloging the types, density, and health of vegetation in the area of interest. This baseline serves as a reference point for the normal state of the environment. After the event, the assessment platform 111 may compare the current state of vegetation with the baseline data to quantify the damage and understand the extent of the impact.

In one instance, the assessment platform 111 may comprise a data collection module 113, a data processing module 115, a claim/policy analysis module 117, a machine learning module 119, a risk or hazard analysis module 121, a recommendation module 123, and a user interface module 125, a smart home controller or computer system, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one instance, the data collection module 113 may collect, e.g., in real-time or near real-time, relevant data from an existing customer filing a claim, a potential customer applying for a new insurance policy or renewing an existing insurance policy, an insurance provider renewing or re-underwriting an existing insurance policy, a third party (e.g., external data sources 129) through various data collection techniques. The relevant data may include historical claims data, insurance information, property data, contextual information, etc. The data collection module 113 may include various software applications (e.g., data mining applications in Extended Meta Language (XML)) that automatically search for and return relevant data associated with the users.

For example, the data collection module 113 may use a web-crawling component to access the camera 103, the user device 105, the smart vehicle 107, the satellite 109, smart home computer systems and devices, and/or various data sources (e.g., database 127, external data sources 129, etc.) to collect the relevant data (e.g., images or videos of the property 101). In one instance, the relevant data are collected and processed by the system 100 if the user has previously consented to a particular program offered by the insurance provider (e.g., a risk or hazard mitigation program that offers a premium discount or other financial incentive or reward in exchange for underwriting using the images or videos, etc.). In some cases, the relevant data may reside in paper files that are scanned or entered into a digital format by a user or by an automated process (e.g., via a scanner).

The data collection module 113 may transmit the collected data to the data processing module 115. In one instance, the data processing module 115 may process the images and/or videos of the property 101 using one or more image analysis techniques (e.g., object recognition, image enhancement, change detection, image classification, image transformation, neural network pattern recognition, matching and classification techniques, etc.) to determine/identify features of the property 101. The data processing module 115 may utilize any suitable image analysis techniques to process the LIDAR data or the satellite imagery to identify tree and vegetation species and/or assess the health of the trees.

In one example, the data processing module 115 may determine whether the identified tree species fall under the categories of trees at higher risk of failure during high strong winds, such as White spruce, Cedar, Bradford pears, Balsam fir, Willow Oaks, Water Oaks, etc. In one example, data processing module 115 may determine whether the measurement (e.g., width, thickness, etc.) of the identified trees or branches exceeds the threshold limit. For example, trees or branches with a width greater than 8 inches in diameter may pose a potential risk to properties, particularly during severe weather conditions or through falling due to decay or instability. In another example, the data processing module 115 may determine whether the identified tree species have shallow or damaged roots, uneven canopies, multiple trunks, or are uprooted during strong winds (wind-throw). In a further example, the data processing module 115 may determine whether the identified vegetation species fall under the categories of vegetation at higher risk of wildfire or pests. In yet another example, the data processing module 115 may determine the distance between the tree and the property 101 (e.g., tree branches above the roof of the property 101, tree trunk and the wall of the property 101, etc.) or the distance between the vegetation and the property 101. In another example, data processing module 115 may determine whether the trees or branches most likely to impact the structure (e.g., property 101) have (i) trunks split into two or more approximately equal diameter within 10 feet above the ground, (ii) dead, broken, or hanging limbs greater than 8-inches in diameter, (iii) noticeable lean or bow in the trunk towards the structure, (iv) visible cracks or oozing seams, (v) mushrooms on the trunk or around the tree's base indicating internal decay of the trees, (vi) large cavities or wounds.

In one instance, the data processing module may implement pattern recognition techniques to identify a leaf pattern and/or a bark pattern of the trees. The data processing module may also use masking techniques to identify which tree portions overhang the property 101. If the data processing module receives multiple images, an image analysis technique is utilized to take advantage of the additional information and/or redundancy to enhance the completeness, accuracy, and/or precision of the identified features.

In one instance, the claim/policy analysis module 117 may process information pertaining to the insurance policy of each user (e.g., policyholder) to determine the benefits specified by the policy and/or the terms and conditions of the policy. In one instance, the claim/policy analysis module 117 may process current claims and/or historical claims submitted by the users to dynamically characterize insurance claims and/or dynamically determine causes of loss associated with insurance claims, which may vary geographically. For example, historical claims may include causes of damages to the property (e.g., wind, fire, snow, hail, mold, smoke, etc.) to assess the claims; total costs for paying the claims; incident reports (e.g., police reports); provide functionality that facilitates or helps insureds to schedule service providers for repairing damage to their homes and vehicles; provide functionality that facilitates or helps insureds in filling out and submitting insurance claims and/or collecting relevant data and documents for such, etc.

For instance, current claims may be related to an ongoing claim filed by the users, but may also include raw data retrieved from another computing system of the system 100. In one instance, the claim/policy analysis module 117 may include speech-to-text algorithms for converting human speech into text, for example, audio recordings when a customer calls a customer service center may be converted to text and further utilized by the machine learning module 119. The claim/policy analysis module 117 may utilize a natural language processing (NLP) unit for identifying human speech patterns in data, including semantic information relating to entities, such as people, vehicles, homes, and other objects.

In one instance, the claim/policy analysis module 117 may include image analysis algorithms for analyzing images (e.g., extracting information from documents), for example, images of handwritten, typed, or printed notes that are submitted with the claims may be converted to text and further utilized by the machine learning module 119. The claim/policy analysis module 117 may perform pattern matching for searching textual claim data for specific strings or keywords in text which may be indicative of particular types of risk. While the examples described herein may refer to analyzing real property insurance claims, it should be appreciated that the techniques described herein may be applicable analyzing claims in other insurance domains, such as agricultural insurance, auto insurance, health or life insurance, renters insurance, personal articles insurance, etc.

When a covered event occurs, the policyholder may file a claim to request compensation. The claim data may include details about the incident, the extent of the loss or damage, and any supporting documentation. The claim/policy analysis module 117 may process the claims data to assess the validity of the claim and determine the amount of compensation owed to the policyholder. In one instance, the claim/policy analysis module 117 may process the claims data to identify areas where policyholders suffer losses due to vegetation-related incidents. In one example, the claim/policy analysis module 117 may gather and maintain detailed claim data, including information on the causes of claims, types of damages, and geospatial location of the incidents. The claim/policy analysis module 117 may process the claim data, in real-time or near real-time, to identify regions with higher frequencies of vegetation-related losses (e.g., patterns and clusters of claims in specific areas can be indicative of higher risks associated with vegetation-related perils). The claim data serves as a multifaceted tool and may also be utilized for (i) fraud detection (e.g., identify patterns in claims indicative of potential fraud), (ii) historical claim data may be utilized to refine underwriting criteria and adjust pricing for specific risks, or (iii) historical claim data may be used for developing new products or enhance existing products to better address the changing needs of the policyholders, thereby improving customer experience.

Figure 4:
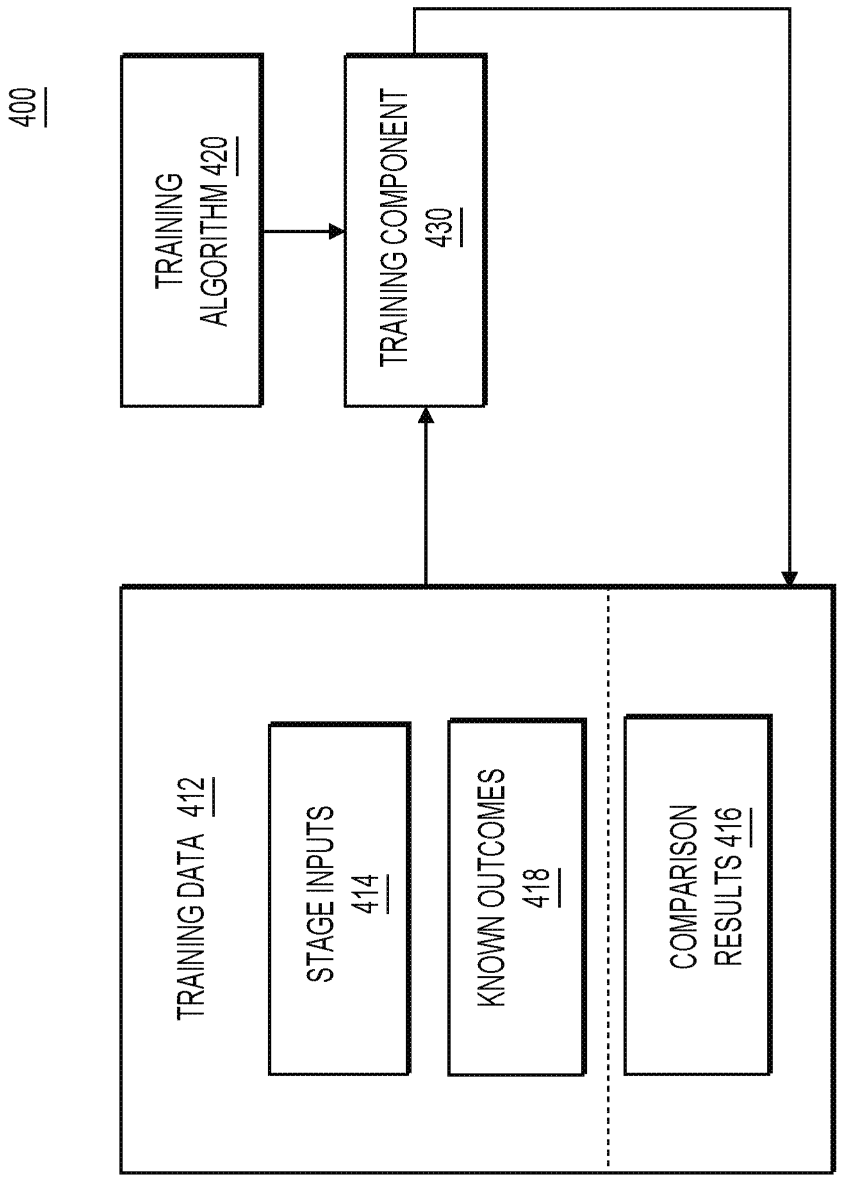
FIG. 4 shows an exemplary machine learning training flow chart.

In one instance, the machine learning module 119 may be configured for supervised machine learning, utilizing training data (e.g., training data 412 illustrated in the training flow chart of FIG. 4). The trained model may be configured for processing historical data associated with the users (e.g., claims data, policy data, property data, incident reports, etc.) to learn patterns indicative of risks to the property 101. In one example, the machine learning module 119 may perform model training using training data (e.g., data from other modules, that contains input and correct output, to allow the model to learn over time). The training may be performed based upon the deviation of a processed result from a documented result when the inputs are fed into the machine learning model (e.g., an algorithm measures its accuracy through the loss function, adjusting until the error has been sufficiently minimized). The trained model may utilize exponential smoothing, autoregressive integrated moving average (ARIMA), or long short-term memory (LSTM) neural networks to analyze one or more features associated with the trees or vegetation around the property to predict risk(s) to the property.

In one instance, the machine learning module 119 may randomize the ordering of the training data, visualize the training data to identify relevant relationships between different variables, identify any data imbalances, and split the training data into two parts where one part is for training a model and the other part is for validating the trained model, de-duplicating, normalizing, correcting errors in the training data, and so on. The machine learning module 119 may implement various machine learning techniques, e.g., neural network (e.g., recurrent neural networks, graph convolutional neural networks, deep learning neural networks), decision tree learning, random forest, association rule learning, inductive programming logic, K-nearest neighbors, cox proportional hazards model, support vector machines, Bayesian models, Gradient boosted machines (GBM), LightGBM (LGBM), Xtra tree classifier, etc. Implementation of the machine learning module 119 is discussed in detail below.

The claim/policy analysis module 117 and the machine learning module 119 may transmit the data relating to the property 101 and the insurance policy, and the historical data (e.g., past claims data, past incident reports, etc.) to the risk or hazard analysis module 121 for further processing. In one instance, the risk or hazard analysis module 121 may analyze the received data and may generate a risk score (e.g., between 0 to 9), wherein a higher risk score(s) may indicate a higher probability for the risk(s) to occur and damage the property 101.

Additionally or alternatively, the risk or hazard analysis module 121 may utilize the rules specifying certain tree species are more prone to failure than others during extreme weather conditions (e.g., due to tree height, shallow-rootedness, etc.) and may determine that the trees around the property 101 are one of such tree species. The risk or hazard analysis module 121 may also utilize the historical and real-time weather data to generate a higher risk score (e.g., a risk score of 7) to indicate the high probability of the trees falling and damaging at least a portion of the property 101 (e.g., a roof, a wall) due to heavy winds in the near future. In another example, the risk or hazard analysis module 121 may utilize the location data and past incident reports to determine that the property 101 is in a wildfire-prone area. The risk or hazard analysis module 121 may also process the vegetation species around the property 101, the layout of the property 101, and the weather data (e.g., weather forecast for the geographic area that includes the property 101) to determine that the vegetation is more likely to catch fire and/or spread the wildfire during the scorching heat of the summer and the layout of the property 101 does not protect the property from wildfire. The risk or hazard analysis module 121 may generate a higher risk score (e.g., a risk score of 9) to indicate a high probability for the property 101 to be damaged due to wildfire. In another example, the risk or hazard analysis module 121 may process the vegetation species around the property 101 to determine that the vegetation causes insect infestation that can damage the property 101.

The risk or hazard analysis module 121 may generate a higher risk or hazard score (e.g., a hazard or risk score of 6) to indicate a probability for the property 101 to be damaged due to insect infestation. In a further example, the risk or hazard analysis module 121 may utilize the location data and past incident reports to determine that the property 101 is in a flood-prone area. The risk or hazard analysis module 121 may also process the vegetation species and the tree species around the property 101, the layout of the property 101, and the weather data to determine that the vegetation and trees do not protect the property 101 during flood or erosion during extreme rainfall in the future. The risk or hazard analysis module 121 may generate a higher risk or hazard score (e.g., a hazard or risk score of 8) to indicate a high probability for the property 101 to be damaged due to flood or erosion.

The risk or hazard analysis module 121 may transmit the risk or hazard score(s) to the recommendation module 123 for further processing. In one instance, the recommendation module 123 may determine whether any risk or hazard-mitigating actions should be taken and/or determine which risk or hazard-mitigating actions to take based upon the risk or hazard score(s). The recommendation module 123 may determine the risk or hazard score(s) exceeds a preconfigured risk or hazard score threshold level and/or a predetermined damage amount threshold level, and may generate a recommended action to prevent the predicted risk or hazard. In one example, the recommendation module 123 may compare the calculated risk score of 7 indicating a high probability of the trees falling and damaging the property 101 to the preconfigured risk or hazard score threshold level and/or a predetermined damage amount threshold level.

The recommendation module 123 may generate, via the user interface module 125, a notification of recommended actions (e.g., tree trimming or tree removal) in the user device 105 of the user. In another example, the recommendation module 123 may compare the calculated risk or hazard score of 9 indicating a high probability of wildfire damaging the property 101 to the preconfigured risk or hazard score threshold level and/or a predetermined damage amount threshold level. The recommendation module 123 may generate, via the user interface module 125, a notification of recommended actions (e.g., vegetation removal or designing a defensible space around the property 101) in the user device 105 of the user (and/or otherwise transmit a notification of recommended actions to a user device for display on that user device).

In a further example, the recommendation module 123 may compare the calculated risk or hazard score of 6 indicating the probability for the property 101 to be damaged due to insect infestation to the preconfigured risk or hazard score threshold level and/or a predetermined damage amount threshold level. The recommendation module 123 may generate, via the user interface module 125, a notification of recommended actions (e.g., vegetation removal or pest control activities) in the user device 105 of the user (and/or otherwise transmit a notification of recommended actions to a user device for display on that user device).

In another example, the recommendation module 123 may compare the calculated risk or hazard score of 8 indicating the high probability for the property 101 to be damaged due to flood or erosion to the preconfigured risk score threshold level and/or a predetermined damage amount threshold level. The recommendation module 123 may generate, via the user interface module 125, a notification of recommended actions (e.g., planting trees and/or vegetation with strong roots or landscape designs to prevent flood) in the user device 105 of the user (and/or otherwise transmit a notification of recommended actions to a user device for display on that user device).

In one instance, the recommendation module 123 may indicate that the users may receive a premium discount or reduced deductible in exchange for performing the recommended actions to prevent the predicted risks and/or hazards. In one instance, the recommendation module 123 may indicate that the insurance discount will increase if the recommended actions are performed and/or completed within a stipulated timeframe. In one instance, the recommendation module 123 may subsidize or otherwise incentivize any risk or hazard-mitigation services.

In one instance, the user interface module 125 may enable a presentation of a graphical user interface (GUI) in the user device 105 that may facilitate visualization of one or more recommendations and/or corrective actions to prevent the predicted risk(s) and/or hazard(s) on the property 101. For example, the indications of risk or hazard levels and/or the risk or hazard-mitigating actions may be displayed in a textual format (e.g., email message), a video format (e.g., a video message), or an aural format by a software application executing on the user device 105 of the policyholder. The user interface module 125 may employ various application programming interfaces (APIs) or other function calls corresponding to the application on the user device 105, thus enabling the display of graphics primitives such as graphs, edges, icons, menus, buttons, data entry fields, etc. As previously discussed, the user interface module 125 may generate a presentation of one or more recommended actions in a user interface of the user device 105.

As an additional aspect of this disclosure, the assessment platform 111 may be configured to analyze the collected data to propose a partial or completely new landscape plan or layout that provides low risk(s) or hazard(s) for existing properties (e.g., fully built houses, parks, schools, businesses, cities, etc.) and/or for new properties. In one example, the users may utilize the landscape plans for renovating the design of their houses and the surrounding areas, or for building a new house on their land and mitigating risk(s) or hazards and potentially receiving insurance benefits, such as enhanced insurance discounts or other cost savings. In one instance, the assessment platform 111 may implement proactive planning of outdoor spaces by implementing responsible vegetation management strategies before the outdoor spaces are created. The assessment platform 111 may consider in detail the selection, placement, and maintenance of vegetation to create resilient and environmentally conscious landscapes. In one example, the assessment platform 111 may employ practices such as native species selection and proper spacing to foster biodiversity and mitigate potential hazards. By integrating environmental considerations and risk mitigation strategies at the inception stage of outdoor spaces, the assessment platform 111 may foster low risk, resilient and sustainable outdoor environments.

As illustrated, the user interface module 125 may display a recommendation of a landscape layout 131 in the user interface of the user device 105. In one example, the partial or complete landscape layout may select lower-maintenance plant varieties (e.g., shrubs, trees, etc.) that do not burn well to protect the property, structures, and/or dwellings from wildfire. In another example, the partial or complete landscape layout may select plant varieties (e.g., trees) with strong roots to protect the property, structures, and/or dwellings from erosion. In a further example, the partial or complete landscape layout may identify vegetation that are flammable and/or attracts pests, and may recommend removal of such vegetation to protect the property, structures, and/or dwellings from fire and/or pests.

In one example, the partial or complete landscape layout may recommend a design that prevents flooding (e.g., building flood-resistant walls, constructing floodwater barriers, highly efficient water drainage system, etc.) or wildfires (e.g., building defensible spaces around the house). In one example, the partial or complete landscape layout may select native plants, bee-friendly and pollinator gardens, and/or plant varieties that require less water for environmentally friendly vegetation management. In another example, the landscape layout 131, may alternatively or additionally propose the building of a defensible space around property 101 to reduce the risk of property damage from wildfires, or otherwise reduce wildfire or fire hazards. A defensible space may be a buffer created between the property 101 and the vegetation, trees, shrubs, or any wildland area that surrounds it. This space may slow or stop the spread of wildfire, and may help to protect the property 101, structures, and/or dwellings from catching fire either from embers, direct flame contact, or radiant heat.

For example, the defensible space may include zone 0, zone 1, and zone 2. In one instance, zone 0 may extend from zero to five feet from the property 101, and the assessment platform 111 may recommend the following for zone 0:

(i) usage of hardscape like grovel, pavers, concrete, and other non-combustible mulch material;

(ii) removal of any dead or dying weeds, grass, branches, and vegetative debris;

(iii) removal of any branches within 10 feet from chimneys or stovepipe outlets;

(iv) limit combustible items (e.g., outdoor furniture, planters, etc.) on top of decks;

(v) relocate firewood and lumber to zone 2;

(vi) replace combustible fencing, gates, and arbors attached to the property 101 with noncombustible alternatives;

(vii) relocating garbage and recycling containers outside zone 0; and/or (viii) relocating boats, vehicles, and other combustible items outside zone 0.

In one instance, zone 1 may extend from five to thirty feet from the property 101, and the assessment platform 111 may recommend the following for zone 1:

(i) removal of any dead plants, grass, and weeds;

(ii) removal of any dead or dry leaves and pine needles from yard, roof, and rain gutters;

(iii) removal of any branches that hang over the roof and are within 10 feet from the chimneys or stovepipe outlets;

(iv) trim trees regularly to keep branches a minimum of 10 feet from other trees;

(v) relocate exposed wood piles outside of zone 1;

(vi) removal of flammable plants and shrubs near windows;

(vii) removal of vegetation and items that could catch fire from around and under decks; and/or (viii) create a separation between trees, shrubs, and items that could catch fire, such as patio furniture, wood piles, swing sets, etc.

In one instance, zone 2 may extend from thirty feet to one hundred feet from the property 101, and the assessment platform 111 may recommend the following for zone 2:

(i) cutting or mowing grasses to a maximum height of four inches;

(ii) all exposed wood piles have a minimum of 10 feet clearance around them, down to bare mineral soil, in all directions;

(iii) create horizontal space between shrubs and trees;

(iv) create vertical space between grass, shrubs, and trees; and/or (v) remove fallen leaves, needles, twigs, bark, cones, and small branches, but may be permitted to w depth of three inches.

In one instance, the user interface module 125 may cause interfacing of guidance information to include, at least in part, one or more annotations, audio messages, video messages, or a combination thereof pertaining to the recommended action(s). The user interface module 125 may also comprises a variety of interfaces, for example, interfaces for data input and output devices, referred to as I/O devices, storage devices, and the like. Still further, the user interface module 125 is configured to operate in connection with augmented reality (AR) processing techniques, wherein various applications, graphic elements, and features interact.

In one instance, the database 127 may be any type of database, such as relational, hierarchical, object-oriented, and/or the like, wherein data are organized in any suitable manner, including data tables or lookup tables. In one instance, the database 127 may access various data sources (e.g., external data sources) and store content associated with the users (e.g., policyholders), the camera 103, the user device 105, the smart vehicle 107, the satellite 109, and the assessment platform 111, and may manage multiple types of information that aid in the content provisioning and sharing process. For example, the database 127 may store images of the property 101 (e.g., a relational database associates each image or set of images with the property 101 and may store information defining different types of property features). For example, the database 127 may store information about the insurance policy of the users (e.g., a type of construction, a type of coverage, etc.). It is understood that any other suitable data may be included in the database 127.

In another instance, the database 127 may include a machine learning based training database with a pre-defined mapping defining a relationship between various input parameters and output parameters based upon various statistical methods. For example, the training database may include machine learning algorithms to learn mappings between input parameters related to the property 101. In one example, the training database may include a dataset that includes data collections that are not subject-specific, e.g., data collections based upon population-wide observations, local, regional, or super-regional observations, and the like. The training database may be routinely updated and/or supplemented based upon the machine learning methods.

In one instance, external data sources 129 may include weather databases that provide weather forecast information (e.g., whether a windstorm, a snowstorm, or a wildfire is expected) or general climate information (e.g., historical tendency to experience snowstorms, hurricanes, wildfire, etc.) for the area in which the property 101 is located. External data sources 129 may include various state or federal databases that provide incident reports (e.g., occurrences of hurricanes, wildfires, typhoons, flooding, erosion, etc.) for the area in which the property 101 is located. In one instance, external data sources 129 may include plant databases that provide information on trees and/or vegetation species (e.g., trees or vegetation at higher risk of failure during extreme weather conditions, trees or vegetation with shallow or damaged roots, trees or vegetation that are uprooted during heavy wind, trees with uneven canopies, trees with two trunks, etc.). It should be understood that external data sources 129 may include any other databases that provide relevant information pertaining to the property 101.

The above presented modules and components of the assessment platform 111 may be implemented in hardware, firmware, software, or a combination thereof. Though depicted as a separate entity in FIG. 1, it is contemplated that the assessment platform 111 may be implemented for direct operation by the respective user device 105. As such, the assessment platform 111 may generate direct signal inputs by way of the operating system of the user device 105. In one instance, one or more of the modules 113-125 may be implemented for operation by the respective user device 105, as the assessment platform 111. The various executions presented herein contemplate any and all arrangements and models.

Exemplary Hazard Determination Flowchart

Figure 2:
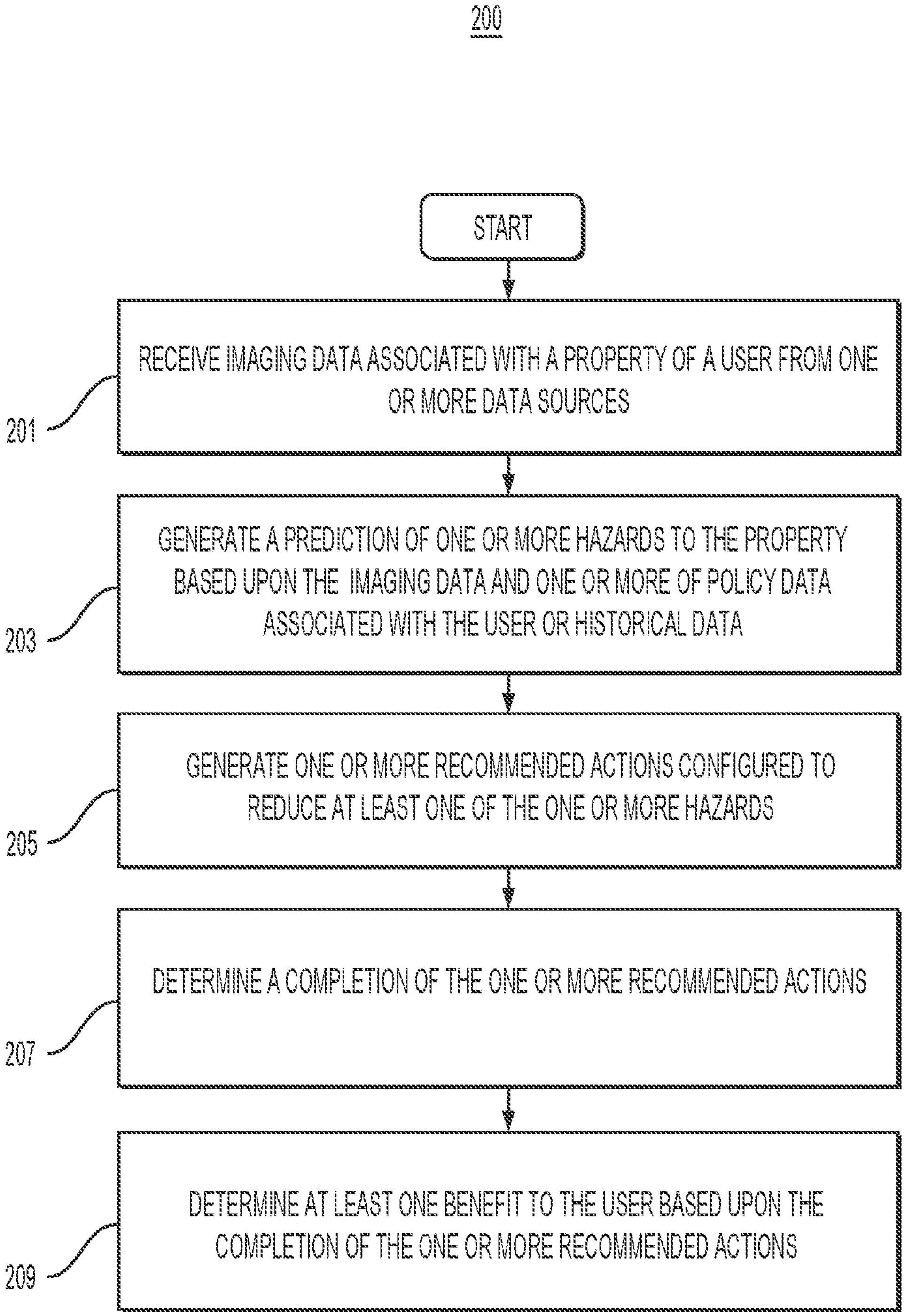
FIG. 2 is a flowchart of an exemplary computer-implemented or computer-based process implementable by the computer system of FIG. 1 for analyzing various data for determining risks or hazards, generating recommended actions to prevent the risks or hazards, and/or providing discounts or otherwise adjusting insurance policies based upon the completion of the recommended actions.
Figure 5:
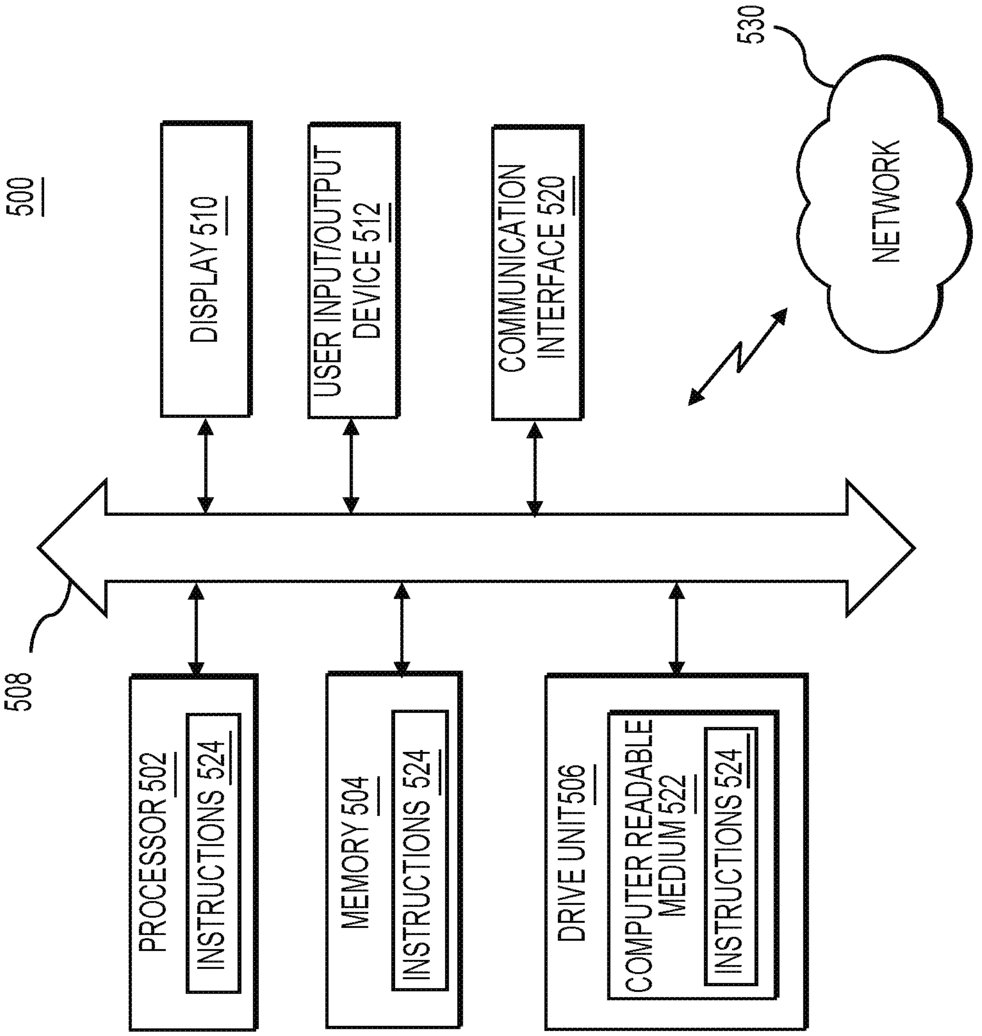
FIG. 5 illustrates an implementation of an exemplary computer system that executes techniques presented herein.

FIG. 2 is an exemplary flowchart of a computer-implemented or computer-based process for analyzing various data for determining risks and/or hazards, generating recommended actions to prevent, reduce, or mitigate the risks and/or hazards, and/or providing discounts, insurance cost savings, or otherwise adjusting insurance policies based upon the completion of the recommended actions. In one instance, the assessment platform 111 and/or any of the modules 113-125 may perform one or more portions of the process 200 and are implemented using, for instance, a chip set including a processor (e.g., processor 502) and a memory (e.g., memory 504) as shown in FIG. 5. As such, the assessment platform 111 and/or any of modules 113-125 may be configured to facilitate accomplishing various parts of the process 200, as well as accomplishing embodiments of other processes described herein in conjunction with other components of the system 100. Although the process 200 is illustrated and described as a sequence of actions, operations, and/or functionality, it is contemplated that various embodiments of the process 200 may be performed in any order or combination and need not include all of the illustrated actions, operations, and/or functionality.

In block 201, the assessment platform 111 may receive imaging data associated with the property 101 (e.g., images and/or videos of the vegetation and trees, claims data, etc.) of the user (e.g., homeowner, customer, or policyholder) from one or more data sources (e.g., the camera 103, the user device 105, the smart vehicle 107, the satellite 109, database 127, smart home cameras, or external data source 129).

In block 203, the assessment platform 111 may generate a prediction of one or more risks or hazards to the property based upon the imaging data and one or more of policy data associated with the user and/or historical data to predict risk(s) or hazards to the property 101. In one instance, the assessment platform 111 may determine whether one or more trees are within a distance threshold of the property 101. A distance threshold is any reasonable distance between the property 101 and the trees that protects the property 101 from damage if the trees were to fall.

In various embodiments, imaging analysis may be used to determine attributes of a tree such as tree size and distance from a structure on the property. The assessment platform 111 may generate a first risk or hazard score indicating a probability of the trees damaging the property 101 based upon the attributes of the trees and/or weather data.

In one instance, the attributes of the trees include tree varieties at a higher risk or likelihood of falling during extreme weather conditions relative to other tree varieties; tree varieties at a higher risk or likelihood of being uprooted during extreme weather conditions relative to other tree varieties; tree varieties with shallow or damaged roots relative to other tree varieties; tree varieties with uneven canopies relative to other tree varieties; tree varieties with multiple trunks; and/or tree varieties that increase risk or likelihood of termite damage to the property relative to other tree varieties.

In one example, the assessment platform 111 may determine: (i) a tree is 10 feet in height, and the distance between the tree and the property 101 is only 5 feet, (ii) the tree is one of the species that is uprooted during heavy winds, and/or (iii) heavy wind condition is expected in the near future. The assessment platform 111 may generate a high-risk or hazard score indicating a high probability of the tree falling and damaging the property 101.

In another example, the assessment platform 111 may determine the property 101 is located in a geographical area with a high risk or likelihood of erosion and/or flooding above a second predetermined threshold based upon: (i) location data (e.g., global positioning system (GPS) data from sensors associated with the user device 105, the smart vehicle 107, the smart home, drone image data, or the satellite 109 reporting on the property 101), (ii) historical data (e.g., past incident reports of flooding and erosion in and around the location of the property 101 from the external data sources 129), (iii) vegetation and tree data (e.g., whether roots of the vegetation and trees around the property 101 are strong to prevent flooding or erosion), and/or (iv) weather data (e.g., heavy and incessant rain is expected in the near future). The assessment platform 111 may generate a second risk or hazard score indicating a high probability of erosion and/or the flooding damaging the property 101.

In another example, the assessment platform 111 may determine the property 101 is located in a geographical area with a high risk or likelihood of wildfire above a third predetermined threshold based upon: (i) location data (e.g., global positioning system (GPS) data from sensors associated with the user device 105, the smart vehicle 107, the smart home, one or more drones, or the satellite 109 reporting on the property 101), (ii) historical data (e.g., past incident reports of wildfire in and around the location of the property 101 from the external data sources 129), (iii) vegetation and tree data (e.g., whether the vegetation and trees around the property 101 are flammable), (iv) property design data (e.g., whether the landscaping of the property 101 is designed to prevent wildfire), and/or (iv) weather data (e.g., high temperature expected in the near future). The assessment platform 111 may generate a third risk or hazard score indicating a high probability of wildfire damaging the property 101.

In another example, the assessment platform 111 may determine overgrown vegetation and/or trees around the property 101 have a predetermined association with pests capable of damaging the property 101 based upon: (iii) vegetation and tree data (e.g., vegetation and trees species that attract pests that cause damage to properties) and/or (ii) historical data (e.g., past incident reports of damages to properties by various pests due to specific vegetation and trees species). The assessment platform 111 may generate a fourth risk or hazard score indicating a high probability of pests damaging the property 101.

In block 205, the assessment platform 111 may generate one or more recommended action(s) configured to reduce at least one of the one or more risks or hazards In one example, the assessment platform 111 may generate a presentation of a recommended action (e.g., requesting the user to trim or remove the tree, etc.) in a user interface of the user device 105 to protect the property 101 from falling trees. In another example, the assessment platform 111 may generate a presentation of recommended actions (e.g., requesting the users to sow plant varieties with strong roots, landscape designs that prevent erosion and/or flooding, referral of a service provider for implementing the landscape designs, etc.) in a user interface of the user device 105 to protect the property 101 from flood and/or erosion.

Additionally or alternatively, the assessment platform 111 may generate a presentation of recommended actions (e.g., requesting the users to remove flammable vegetation around the property 101; sow lower-maintenance plant varieties that does not burn well; landscape designs that provide defensible spaces to protect the property 101 from the wildfire; referral of a service provider for implementing the landscape designs; etc.) in a user interface of the user device 105 to protect the property 101 from wildfire. In another example, the assessment platform 111 may generate a presentation of recommended actions (e.g., removal of the overgrown vegetation that attracts pests, referral of a service provider for pest control, etc.) in a user interface of the user device 105 to protect the property 101 from pests. In another instance, the recommended action(s) may also include useful tips on environmentally friendly vegetation management, such as poison free weed killer, native plants, integrating bee-friendly and pollinator gardens into traditional landscaping plans, and plants that require less water. Such recommended actions are arranged in the user interface of the user device 105 based upon their risk or hazard scores (e.g., first risk or hazard score, second risk or hazard score, third risk or hazard score, fourth risk or hazard score, etc.) indicating the probability of damages to the property is above a predetermined threshold.

In block 207, the assessment platform 111 may determine the completion of the recommended action(s) by the user or service provider(s). In one instance, the assessment platform 111 may receive response data (e.g., image data, video data, textual data, audio data, sensor data, vehicle image or sensor data, home image or sensor data, drone image or sensor data, etc.) to the recommended actions from one or more data sources (e.g., the camera 103, the user device 105, the smart vehicle 107, smart home, drone, and/or the satellite 109).

The assessment platform 111 may analyze the response data to determine the recommended actions have been completed. For example, the assessment platform 111 may receive images or videos of trimmed or cut trees from the satellite 109 indicating that the user has undertaken preventive measures to protect the property 101 from falling trees or other hazards. For example, the assessment platform 111 may receive images or videos of the landscape layout with safe spaces (e.g., tiles around the property 101) from the satellite 109 indicating that the user has undertaken preventive measures to protect the property 101 from wildfire.

In one instance, the assessment platform 111 may collect, in real-time or near real-time, data associated with properties with appropriate vegetation that reduce the risk of occurrence of erosion and properties without adequate vegetation to prevent erosion. The assessment platform 111 may analyze the collected data to select a recommendation that is the most effective at mitigating the risk of erosion.

In block 209, the assessment platform 111 may determine at least one benefit to the user upon completion of the recommended action(s). In one instance, the benefit may include premium policy discounts, other insurance cost savings, reduced deductibles, subsidized risk-mitigation services, and any other type of perks that may incentivize the users to undertake risk-mitigating actions.

Exemplary Machine Learning

Figure 3:
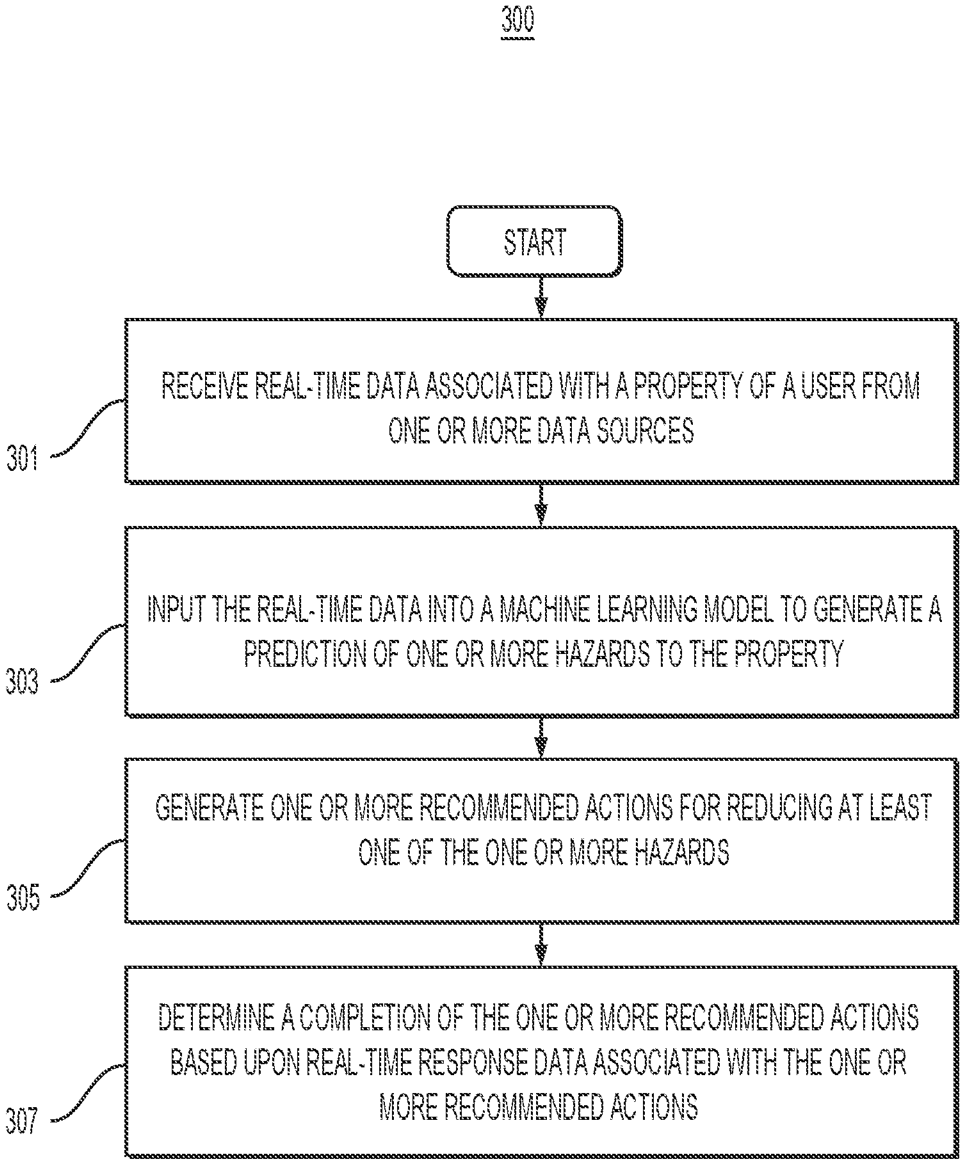
FIG. 3 is a flowchart of an exemplary computer-implemented or computer-based a process implementable by the system of FIG. 1 for utilizing a machine learning model for predicting risk or hazards for a property and/or generating recommended action(s) (such actions intended to mitigate or prevent damage to homes, vehicles, or other items) to prevent or reduce the occurrence of the risks or hazards

FIG. 3 is a flowchart of an exemplary computer-implemented or computer-based process for utilizing a machine learning model for predicting risk for a property and generating recommended action(s) to prevent the occurrence of the risk or hazard, or otherwise to mitigate or prevent any damage resulting from the risk or hazard. In one instance, the assessment platform 111 and/or any of the modules 113-125 may perform one or more portions of the process 300 and are implemented using, for instance, a chip set including a processor (e.g., processor 502) and a memory (e.g., memory 504) as shown in FIG. 5. As such, the assessment platform 111 and/or any of modules 113-125 may be configured for accomplishing various parts of the process 300, as well as accomplishing embodiments of other processes described herein in conjunction with other components of the system 100. Although the process 300 is illustrated and described as a sequence of actions, operations, and/or functionality, it is contemplated that various embodiments of the process 300 are performed in any order or combination and need not include all of the illustrated actions, operations, or functionality.

In block 301, the assessment platform 111 may receive real-time data associated with the property 101 from one or more data sources (e.g., the camera 103, the user device 105, the smart vehicle 107, a smart home, a drone, the satellite 109, database 127, or external data source 129). In one example, the camera 103, the user device 105, the smart vehicle 107, a smart home, a drone, and/or the satellite 109 may transmit, in real-time, images and/or videos of the vegetation and trees around the property 101. In one instance, the data includes one or more of image or LiDAR data for the property, and/or other sensor data, including that discussed elsewhere herein.

In block 303, the assessment platform 111 may input the real-time data into a machine learning model to generate a prediction of risk(s) or hazards to the property 101. In one instance, the machine learning model is a trained machine learning model that processes historical data to learn patterns/associations indicative of risk(s) or hazards to the property 101.

In one example, the real-time data inputted into the machine learning model may include data indicative of a distance between one or more trees and the property, a predetermined distance threshold, and attribute data regarding one or more trees. The machine learning model may be trained to output a first risk or hazard score indicating a probability of one or more trees damaging the property 101. In another example, the real-time data inputted into the machine learning model may include data indicative of the risk or likelihood of erosion or flooding for a geographical area including the property 101. The machine learning model may be trained to output a second risk or hazard score indicating a probability of erosion or flooding damaging the property. In another example, the real-time data inputted into the machine learning model may include data indicative of the risk of wildfire for a geographical area including the property 101. The machine learning model may be trained to output a third risk or hazard score indicating a probability or likelihood of the wildfire damaging the property.

In block 305, the assessment platform 111, may generate recommended action(s) for reducing, preventing, and/or mitigating the risk(s) and hazard(s). In one instance, the assessment platform 111 may cause a presentation of the recommended action(s) in a user interface of the user device 105. The recommended action(s) are arranged in the user interface based upon a risk or hazard score indicating a probability or likelihood of occurrence of the risk(s) or hazard(s) damaging the property 101, vehicles parked on the property 101, etc. In one instance, the recommended action(s) may include trimming the trees, removal of the trees, removal of flammable vegetation around the property 101, removal of overgrown vegetation that attracts pests, sowing plant varieties with strong roots, sowing lower-maintenance plant varieties, and landscape designs that prevent erosion, flooding, or wildfire.

In one instance, the cost of tree removal may vary significantly based on several factors, and the assessment platform 111 may develop a reliable and accurate method of calculating tree removal cost based on the collected data (e.g., tree data, environmental data, etc.). In one example, the assessment platform 111 may process one or more of (i) tree size and types (e.g., larger trees generally cost more to remove than smaller trees, some type of trees are harder to remove due to their structure (e.g., hardwood trees)), (ii) location and accessibility of the trees (e.g., trees located in challenging areas may require additional equipment and manpower and are more expensive to remove), (iii) condition of the tree (e.g., dead trees may be more dangerous to remove, requiring extra precaution and potentially increasing the cost), (iv) total number of trees being removed (e.g., cutting a higher number of trees results in higher costs), or (v) emergency situation (e.g., urgent tree removal after a storm or due to safety concerns may incur additional costs) to determine the cost of tree removal. It is understood that any other type of data may be used by the assessment platform 111 while calculating the cost of tree removal. The assessment platform 111 ensures fair pricing and facilitates informed decision-making for property owner seeking tree removal services.

In block 307, the assessment platform 111, via processor 502, may determine a completion of the recommended action(s) by the user or service provider(s) based upon real-time response data associated with the recommended action(s). In one instance, the assessment platform 111 utilizing the machine learning model, may determine a reduction in the possibility for the risk(s) or hazard(s) to occur based upon the completion of the recommended actions. The assessment platform 111 may then determine at least one benefit (e.g., premium policy discounts, reduced deductibles, other insurance cost savings, etc.) for the user based upon the reduction in the possibility for the risk(s).

Exemplary Machine Learning Techniques

One or more implementations disclosed herein include and/or may be implemented using a machine learning model. For example, one or more of the modules of assessment platform 111 may be implemented using a machine learning model and/or may be used to train the machine learning model. A given machine learning model may be trained using the data flow 400 of FIG. 4. Training data 412 may include one or more of stage inputs 414 and known outcomes 418 related to the machine learning model to be trained. The stage inputs 414 may be from any applicable source including text, visual representations, data, values, comparisons, stage outputs, e.g., one or more outputs from one or more actions or operations from FIGS. 2 and 3. The known outcomes 418 may be included for the machine learning models generated based upon supervised or semi-supervised training. An unsupervised machine learning model may not be trained using known outcomes 418. Known outcomes 418 may include known or desired outputs for future inputs similar to or in the same category as stage inputs 414 that do not have corresponding known outputs.

The training data 412 and a training algorithm 420, e.g., one or more of the modules implemented using the machine learning model and/or may be used to train the machine learning model, may be provided to a training component 430 that may apply the training data 412 to the training algorithm 420 to generate the machine learning model. According to an implementation, the training component 430 may be provided comparison results 416 that compare a previous output of the corresponding machine learning model to apply the previous result to re-train the machine learning model. The comparison results 416 may be used by training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, models specifically discussed in the present disclosure, or the like.

The machine learning model used herein may be trained and/or used by adjusting one or more weights and/or one or more layers of the machine learning model. For example, during training, a given weight may be adjusted (e.g., increased, decreased, removed) based upon training data or input data. Similarly, a layer may be updated, added, or removed based upon training data/and or input data. The resulting outputs may be adjusted based upon the adjusted weights and/or layers.

In general, any process or operation discussed in this disclosure is understood to be computer-implementable, such as the processes illustrated in FIGS. 2 and 3 may be performed by one or more processors of a computer system as described herein. A process or process action or operation performed by one or more processors may also be referred to as an operation. The one or more processors may be configured to perform such processes by having access to instructions (e.g., software or computer-readable code) that, when executed by one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

Exemplary Computing Environment

FIG. 5 illustrates an implementation of a computer system that may execute techniques presented herein. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 may be implemented using electronic devices that provide voice, video, or data communication. Further, while the computer system 500 is illustrated as a single system, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the processor 502 executing the instructions stored in the memory 504. The functions, acts, or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing, and the like.

As shown, the computer system 500 may further include a display 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input/output device 512 configured to allow a user to interact with any of the components of the computer system 500. The input/output device 512 may be a number pad, a keyboard, or a cursor control device, such as a mouse, or a joystick, touch screen display, remote control, or any other device operative to interact with the computer system 500.

The computer system 500 may also or alternatively include drive unit 506 implemented as a disk or optical drive. The drive unit 506 may include a computer-readable medium 522 in which one or more sets of instructions 524, e.g., software, can be embedded. Further, instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, computer-readable medium 522 includes the set of instructions 524 or receives and executes the set of instructions 524 responsive to a propagated signal so that a device connected to network 530 can communicate voice, video, audio, images, or any other data over the network 530. Further, the set of instructions 524 may be transmitted or received over the network 530 via communication port or interface 520, and/or using bus 508. The communication port or interface 520 may be a part of the processor 502 or may be a separate component. The communication port or interface 520 may be created in software or may be a physical connection in hardware. The communication port or interface 520 may be configured to connect with a network 530, external media, the display 510, or any other components in computer system 500, or combinations thereof. The connection with the network 530 may be a physical connection, such as a wired Ethernet connection or may be established wirelessly as discussed below. Likewise, the additional connections with other components of the computer system 500 may be physical connections or may be established wirelessly. The network 530 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that causes a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Computer system 500 may be connected to network 530. The network 530 may define one or more networks including wired or wireless networks. The wireless network may be a cellular telephone network, an 802.10, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 530 may include wide area networks (WAN), such as the Internet, local area networks (LAN), campus area networks, metropolitan area networks, a direct connection such as through a Universal Serial Bus (USB) port, or any other networks that may allow for data communication.

The network 530 may be configured to couple one computing device to another computing device to enable communication of data between the devices. The network 530 may generally be enabled to employ any form of machine-readable media for communicating information from one device to another. The network 530 may include communication methods by which information may travel between computing devices.

The network 530 may be divided into sub-networks. The sub-networks may allow access to all of the other components connected thereto or the sub-networks may restrict access between the components. The network 530 may be regarded as a public or private network connection and may include, for example, a virtual private network or an encryption or other security mechanism employed over the public Internet, or the like.

Exemplary Embodiments

A computer-implemented method for analyzing vegetation may be provided. The computer-implemented method may be performed by one or more local or remote processors of a computing system in communication with one or more local or remote data sources. The computer-implemented method may include (1) receiving, by the one or more processors, imaging data associated with a property of a user from the one or more data sources; (2) generating, by the one or more processors, a prediction of one or more risks or hazards to the property based upon the imaging data and one or more of policy data associated with the user or historical data; (3) generating, by the one or more processors, one or more recommended actions configured to reduce at least one of the one or more risks or hazards; (4) determining, by the one or more processors, a completion of the one or more recommended actions; and/or (5) determining, by the one or more processors, at least one benefit to the user based upon the completion of the one or more recommended actions. The at least one benefit upon completion of the one or more recommended actions may include a policy premium reduction, an increase in discounts, or other insurance cost-savings. The method may include additional, less, or alternate functionality, including that discussed elsewhere herein.

For instance, generating of the prediction of the one or more risks or hazards to the property may include (i) determining, by the one or more processors, one or more trees are within a distance threshold of the property; and/or (ii) generating, by the one or more processors, a first risk or hazard score indicating a probability of the one or more trees damaging the property based upon at least one of attributes of the one or more trees or weather data.

In some embodiments, the voice bots or chatbots may be configured to utilize AI and/or ML techniques, such as for input or output devices. For instance, a voice bot or chatbot may be a ChatGPT chatbot, an InstructGPT bot, a Codex bot, or a Google Bard bot. The voice bot or chatbot may employ supervised or unsupervised ML techniques, which may be followed by, and/or used in conjunction with, reinforced or reinforcement learning techniques. The voice bot or chatbot may employ the techniques utilized for ChatGPT, InstructGPT bot, Codex bot, or Google Bard bot.

In certain aspects, the attributes of one or more trees may include (i) tree varieties at a higher risk or hazard of falling during extreme weather conditions relative to other tree varieties, (ii) tree varieties at a higher risk or hazard of being uprooted during the extreme weather conditions relative to other tree varieties, (iii) tree varieties with shallow or damaged roots relative to other tree varieties, (iv) tree varieties with uneven canopies relative to other tree varieties, (v) tree varieties with multiple trunks, and/or (vi) tree varieties that increase a risk or hazard of termite damage to the property relative to other tree varieties.

Additionally or alternatively, generating the one or more recommended actions may include causing a presentation of the one or more recommended actions in a user interface of a device (e.g., user device 105) associated with the user. The one or more recommended actions are arranged based upon the first risk or hazard score indicating a probability of the one or more trees damaging the property (e.g., property 101) is above a first predetermined threshold. The one or more recommended actions may include (i) trimming of the one or more trees and/or (ii) removal of the one or more trees.

Further, generating the prediction of the one or more risks or hazards to the property may include (i) determining, by the one or more processors, that the property is located in a geographical area with a risk or hazard of at least one of erosion or flooding above a second predetermined threshold; and/or (ii) generating, by the one or more processors, a second risk or hazard score indicating a probability of the at least one of erosion or the flooding damaging the property based upon (i) vegetation around the property, (ii) the historical data, or (iii) weather data.

In various embodiments, generating the one or more recommended actions may include causing, by the one or more processors, a presentation of the one or more recommended actions in a user interface of a device (e.g., user device 105) associated with the user. The one or more recommended actions are arranged based upon the second risk or hazard score indicating a probability of the erosion and/or the flooding damaging the property (e.g., property 101) above the second predetermined threshold. The one or more recommended actions may include (i) sowing plant varieties with strong roots, (ii) landscape designs that prevent the at least one of erosion or the flooding, or (iii) identification of a service provider for implementing the landscape designs.

Generating a prediction of one or more risks or hazards to the property may include (i) determining, by the one or more processors, that the property is located in a geographical area with a risk or hazard of wildfire above a third predetermined threshold; and/or (ii) generating, by the one or more processors, a third risk or hazard score indicating a probability of the wildfire damaging the property based upon (i) type of vegetation within immediate surroundings of the property, (ii) the historical data, or (iii) weather data.

In certain embodiments, generating the one or more recommended actions may include causing, by the one or more processors, a presentation of the one or more recommended actions in a user interface of a device (e.g., user device 105) associated with the user. The one or more recommended actions are arranged based upon the third risk or hazard score indicating a probability of the wildfire damaging the property above the third predetermined threshold. The one or more recommended actions may include (i) removal of flammable vegetation around the property, (ii) sowing lower-maintenance plant varieties, (iii) landscape designs that protect the property from the wildfire, or (iv) identification of a service provider for implementing the landscape designs.

Generating a prediction of the one or more risks or hazards to the property may include (i) determining, by the one or more processors, overgrown vegetation around the property having a predetermined association with attraction of pests capable of property damage; and/or (ii) generating, by the one or more processors, a fourth risk or hazard score indicating a probability of the pests damaging the property based upon (i) determined overgrown vegetation and/or (ii) the historical data.

Additionally or alternatively, generating the one or more recommended actions may include causing, by the one or more processors, a presentation of the one or more recommended actions in a user interface of a device (e.g., user device 105) associated with the user. The one or more recommended actions are arranged based upon the fourth risk or hazard score indicating a probability of the pests damaging the property above a fourth predetermined threshold. The one or more recommended actions may include (i) removal of the overgrown vegetation that attracts pests or (ii) identification of a service provider for pest control.

In some embodiments, determining the completion of the one or more recommended actions may include (i) receiving, by the one or more processors, response data to the one or more recommended actions from the one or more data sources, wherein the response data includes image data; and/or (ii) analyzing, by the one or more processors, the response data to determine the completion of the one or more recommended actions.

A computer-implemented method for analyzing vegetation may be provided. The computer-implemented method may be performed by one or more local or remote processors of a computing system in communication with one or more local or remote data sources and a machine learning model. The computer-implemented method may include (1) receiving, by the one or more processors, real-time data associated with a property of a user from the one or more data sources, wherein the data includes one or more of image or LiDAR data for the property; (2) inputting, by the one or more processors, the real-time data into the machine learning model to generate a prediction of one or more risks or hazards to the property, wherein the machine learning model is a trained machine learning model that processes historical data to learn associations indicative of the one or more risks or hazards to the property; (3) generating, by the one or more processors, one or more recommended actions for reducing at least one of the one or more risks or hazards; and/or (4) determining, by the one or more processors, a completion of the one or more recommended actions based upon real-time response data associated with the one or more recommended actions. The method may include additional, less, or alternate functionality, including that discussed elsewhere herein.

For instance, the method for analyzing vegetation may include (i) determining, by the one or more processors utilizing the machine learning model, a reduction in the one or more risks or hazards based upon the completion of the one or more recommended actions; and/or (ii) calculating, by the one or more processors, at least one benefit for the user based upon the reduction in the one or more risks or hazards, wherein the at least one benefit includes a policy premium reduction.

The real-time data inputted into the machine learning model may include (i) data indicative of one or more of a distance between one or more trees and the property, (ii) a predetermined distance threshold, and (iii) attribute data regarding the one or more trees. The machine learning model is trained to output a first risk or hazard score indicating a probability of the one or more trees damaging the property.

The real-time data inputted into the machine learning model may include data indicative of risk or hazard of one or more of erosion or flooding for a geographical area including the property. The machine learning model is trained to output a second risk or hazard score indicating a probability of the erosion or flooding damaging the property.

The real-time data inputted into the machine learning model may include data indicative of risk or hazard of wildfire for a geographical area including the property. The machine learning model is trained to output a third risk or hazard score indicating a probability of the wildfire damaging the property.

Additionally or alternatively, generating the one or more recommended actions may include causing, by the one or more processors, a presentation of the one or more recommended actions in a user interface of a device (e.g., user device 105) associated with the user. The one or more recommended actions are arranged based upon a risk or hazard score indicating a probability of occurrence of the one or more risk or hazards damaging the property.

In certain embodiments, the one or more recommended actions may include (i) trimming one or more trees, (ii) removal of the one or more trees, (iii) removal of flammable vegetation around the property, (iv) removal of overgrown vegetation that attracts pests, (v) sowing plant varieties with strong roots, (vi) sowing lower-maintenance plant varieties, and/or (vii) landscape designs that prevent erosion, flooding, or wildfire.

In one aspect, a computer-implemented method for generating landscape recommendations may also be provided. The computer-implemented method may be performed by one or more local or remote processors of a computing system in communication with one or more local or remote data sources. The computer-implemented method may include (1) receiving, by the one or more processors, imaging data associated with a property of a user from the one or more data sources; and/or (2) generating, by the one or more processors, a landscape layout for the property to reduce at least one or more risks or hazards to the property based upon the landscape. The landscape layout may include one or more of (i) building defensible spaces, (ii) sowing lower-maintenance plant varieties, (iii) sowing plant varieties with strong roots, (iv) trimming or removal of one or more trees, (v) removal of flammable vegetation around the property, and/or (vi) removal of overgrown vegetation that attracts pests.

Additional Considerations

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the actions, operations, and/or functionality of computer-implemented methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Finally, unless a claim element is defined by expressly reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for analyzing vegetation, performed by one or more processors of a computing system in communication with one or more data sources and a machine learning model, the computer-implemented method comprising:

receiving, by the one or more processors, real-time data associated with a property of a user from one or more sensors, wherein the data includes one or more images or LiDAR data for the property;

identifying, by the one or more processors, one or more relevant features associated with the property by applying one or more image analysis techniques to the real-time data, wherein the one or more relevant features include (i) a structural condition change of the property, (ii) a vegetation attribute change of vegetation surrounding the property, or (iii) a weather condition change;

inputting, by the one or more processors, the one or more relevant features into the machine learning model, wherein the machine learning model is a trained machine learning model that retrieves and processes historical data to learn one or more patterns and trends indicative of one or more hazards to the property;

generating, by the one or more processors utilizing the trained machine learning model, a hazard prediction corresponding to the property, wherein the trained machine learning model is configured to associate the one or more relevant features with the one or more learned patterns and trends;

generating, by the one or more processors, one or more recommended actions based upon the hazard prediction for reducing at least one of the one or more hazards;

presenting, by the one or more processors, the one or more recommended actions in a user interface of a device associated with the user, wherein the one or more recommended actions are arranged based upon a hazard score indicating a probability of occurrence of the one or more hazards damaging the property; and determining, by the one or more processors, a completion of the one or more recommended actions based upon real-time response data associated with the one or more recommended actions.

2. The computer-implemented method of claim 1, further comprising:

determining, by the one or more processors utilizing the machine learning model, a reduction in the one or more hazards based upon the completion of the one or more recommended actions; and calculating, by the one or more processors, at least one benefit for the user based upon the reduction in the one or more hazards, wherein the at least one benefit includes a policy premium reduction.

3. The computer-implemented method of claim 1, wherein the one or more relevant features inputted into the machine learning model includes data indicative of one or more of a distance between one or more trees and the property, a predetermined distance threshold, and attribute data regarding the one or more trees, and wherein the machine learning model is trained to output a first hazard score indicating a probability of the one or more trees damaging the property.

4. The computer-implemented method of claim 1, wherein the one or more relevant features inputted into the machine learning model includes data indicative of hazard of one or more of erosion or flooding for a geographical area including the property, and wherein the machine learning model is trained to output a second hazard score indicating a probability of the erosion or flooding damaging the property.

5. The computer-implemented method of claim 1, wherein the one or more relevant features inputted into the machine learning model includes data indicative of hazard of wildfire for a geographical area including the property, and wherein the machine learning model is trained to output a third hazard score indicating a probability of the wildfire damaging the property.

6. The computer-implemented method of claim 1, wherein the one or more recommended actions include one or more of trimming one or more trees, removal of the one or more trees, removal of flammable vegetation around the property, removal of overgrown vegetation that attracts pests, sowing plant varieties with strong roots, sowing lower-maintenance plant varieties, and landscape designs that prevent erosion, flooding, or wildfire.

7. The computer-implemented method of claim 1, wherein the one or more image analysis techniques include an object recognition technique, a neural network pattern recognition technique, or an image classification technique.

8. The computer-implemented method of claim 1, wherein the trained machine learning model is configured to learn the one or more patterns and trends over time by adjusting one or more model parameters based upon a deviation between a predicted result and a documented result, the adjustment performed using a loss function to iteratively minimize a prediction error.

9. The computer-implemented method of claim 1, wherein the one or more recommended actions are generated upon determining that the hazard prediction exceeds a hazard score threshold level.

10. A system for analyzing vegetation, the system comprising one or more processors in communication with one or more data sources and a machine learning model, and at least one non-transitory computer readable medium storing instructions which, when executed by the one or more processors, cause the one or more processors to perform operations comprising:

receiving, by the one or more processors, real-time data associated with a property of a user from one or more sensors, wherein the data includes one or more images or LiDAR data for the property;

identifying, by the one or more processors, one or more relevant features associated with the property by applying one or more image analysis techniques to the real-time data, wherein the one or more relevant features include (i) a structural condition change of the property, (ii) a vegetation attribute change of vegetation surrounding the property, or (iii) a weather condition change;

inputting, by the one or more processors, the one or more relevant features into the machine learning model, wherein the machine learning model is a trained machine learning model that retrieves and processes historical data to learn one or more patterns and trends indicative of one or more hazards to the property;

generating, by the one or more processors utilizing the trained machine learning model, a hazard prediction corresponding to the property, wherein the trained machine learning model is configured to associate the one or more relevant features with the one or more learned patterns and trends;

generating, by the one or more processors, one or more recommended actions based upon the hazard prediction for reducing at least one of the one or more hazards;

presenting, by the one or more processors, the one or more recommended actions in a user interface of a device associated with the user, wherein the one or more recommended actions are arranged based upon a hazard score indicating a probability of occurrence of the one or more hazards damaging the property; and determining, by the one or more processors, a completion of the one or more recommended actions based upon real-time response data associated with the one or more recommended actions.

11. The system of claim 10, further comprising:

determining, by the one or more processors utilizing the machine learning model, a reduction in the one or more hazards based upon the completion of the one or more recommended actions; and calculating, by the one or more processors, at least one benefit for the user based upon the reduction in the one or more hazards, wherein the at least one benefit includes a policy premium reduction.

12. The system of claim 10, wherein the one or more relevant features inputted into the machine learning model includes data indicative of one or more of a distance between one or more trees and the property, a predetermined distance threshold, and attribute data regarding the one or more trees, and wherein the machine learning model is trained to output a first hazard score indicating a probability of the one or more trees damaging the property.

13. The system of claim 10, wherein the one or more relevant features inputted into the machine learning model includes data indicative of hazard of one or more of erosion or flooding for a geographical area including the property, and wherein the machine learning model is trained to output a second hazard score indicating a probability of the erosion or flooding damaging the property.

14. The system of claim 10, wherein the one or more relevant features inputted into the machine learning model includes data indicative of hazard of wildfire for a geographical area including the property, and wherein the machine learning model is trained to output a third hazard score indicating a probability of the wildfire damaging the property.

15. The system of claim 10, wherein the one or more recommended actions include one or more of trimming one or more trees, removal of the one or more trees, removal of flammable vegetation around the property, removal of overgrown vegetation that attracts pests, sowing plant varieties with strong roots, sowing lower-maintenance plant varieties, and landscape designs that prevent erosion, flooding, or wildfire.

16. A non-transitory computer readable medium for analyzing vegetation, the non-transitory computer readable medium storing instructions which, when executed by one or more processors of a computing system in communication with one or more data sources and a machine learning model, cause the one or more processors to perform operations comprising:

receiving real-time data associated with a property of a user from one or more sensors, wherein the data includes one or more images or LiDAR data for the property;

identifying one or more relevant features associated with the property by applying one or more image analysis techniques to the real-time data, wherein the one or more relevant features include (i) a structural condition change of the property, (ii) a vegetation attribute change of vegetation surrounding the property, or (iii) a weather condition change;

inputting the one or more relevant features into the machine learning model, wherein the machine learning model is a trained machine learning model that retrieves and processes historical data to learn one or more patterns and trends indicative of one or more hazards to the property;

generating, utilizing the trained machine learning model, a hazard prediction corresponding to the property, wherein the trained machine learning model is configured to associate the one or more relevant features with the one or more learned patterns and trends;

generating one or more recommended actions based upon the hazard prediction for reducing at least one of the one or more hazards;

presenting the one or more recommended actions in a user interface of a device associated with the user, wherein the one or more recommended actions are arranged based upon a hazard score indicating a probability of occurrence of the one or more hazards damaging the property; and determining a completion of the one or more recommended actions based upon real-time response data associated with the one or more recommended actions.

17. The non-transitory computer readable medium of claim 16, further comprising:

determining, by the one or more processors utilizing the machine learning model, a reduction in the one or more hazards based upon the completion of the one or more recommended actions; and calculating, by the one or more processors, at least one benefit for the user based upon the reduction in the one or more hazards, wherein the at least one benefit includes a policy premium reduction.

18. The non-transitory computer readable medium of claim 16, wherein the one or more relevant features inputted into the machine learning model includes data indicative of one or more of a distance between one or more trees and the property, a predetermined distance threshold, and attribute data regarding the one or more trees, and wherein the machine learning model is trained to output a first hazard score indicating a probability of the one or more trees damaging the property.

* * * * *